US012639180B2

(12) United States Patent      (10) Patent No.:   US 12,639,180 B2

Chen et al.            (45) Date of Patent:      May 26, 2026

(54) MULTI-POWER-DOMAIN EMULATED PERSISTENT MEMORY RESOURCE SYSTEM

(71) Applicant: Dell Products L.P., Round Rock, TX (US)

(72) Inventors: Xiangping Chen, Sherborn, MA (US); Shyamkumar T. Iyer, Cedar Park, TX (US); Xunce Zhou, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 18/739,742

(22) Filed: Jun. 11, 2024

(65) Prior Publication Data

US 2025/0377993 A1     Dec. 11, 2025

(51) Int. Cl.
    *G06F 11/00*        (2006.01)
    *G06F 11/20*        (2006.01)
    *G06F 11/30*        (2006.01)

(52) U.S. Cl.
    CPC ...... *G06F 11/2056* (2013.01); *G06F 11/3037* (2013.01)

(58) Field of Classification Search
    CPC .......................... G06F 11/2056; G06F 11/3037
    See application file for complete search history.

(56) References Cited

U.S. PATENT DOCUMENTS

| | | | | |
|---|---|---|---|---|
| 8,892,831 | B2 * | 11/2014 | Khmelnitsky | ...... G06F 13/4239 |
| | | | | 713/323 |
| 9,921,762 | B2 * | 3/2018 | Amidi | ................. G06F 11/1612 |
| 10,146,483 | B2 * | 12/2018 | Nishino | ................ G06F 3/0634 |
| 10,289,181 | B2 * | 5/2019 | Bolt | ...................... G06F 3/0619 |
| 10,956,323 | B2 * | 3/2021 | Juenemann | ........... G06F 3/0619 |
| 11,714,725 | B2 * | 8/2023 | Zubair | ................ G06F 11/1469 |
| | | | | 714/6.12 |

(Continued)

OTHER PUBLICATIONS

Rob Davis et al., "Persistent Memory over Fabrics," Flash Memory Summit 2017, Santa Clara, CA, 22 pages. Retrieved from the Internet: https://www.flashmemorysummit.com/English/Collaterals/Proceedings/2017/20170809_FR22_Davis.pdf.

*Primary Examiner* — Amine Riad

(74) *Attorney, Agent, or Firm* — Joseph Mencher

(57) ABSTRACT

A multi-power-domain emulated persistent memory resource system includes a memory interface/data mover subsystem coupled to a second memory subsystem in a second power domain, and a microvisor subsystem coupled to the memory interface/data mover subsystem and a first memory subsystem in a first power domain that is different than the second power domain. The microvisor subsystem presents an emulated persistent memory resource to a client device using the first memory subsystem, and monitors metadata for the first memory subsystem to identify modification(s) of data in the first memory subsystem. In response, the microvisor subsystem uses the memory interface/data mover subsystem to copy the data from the first memory subsystem to the second memory subsystem. Following unavailability of the first power domain and corresponding loss of the data on the first memory subsystem, the memory interface/data mover subsystem copies the data from the second memory subsystem to the first memory subsystem.

20 Claims, 23 Drawing Sheets

(56)          References Cited

U.S. PATENT DOCUMENTS

2019/0049858  A1*   2/2019   Gurevich  ............ G03F 7/70633
2023/0055136  A1*   2/2023   Mysore Shantamurthy  ...............
                                                      G06F 11/2038
2025/0094061  A1*   3/2025   Lee  ....................... G06F 3/0685

* cited by examiner

302

RESOURCE
MANAGEMENT
SYSTEM
304

RESOURCE
SYSTEM
306a

RESOURCE
SYSTEM
306b

RESOURCE
SYSTEM
306c

LCS PROVISIONING SUBSYSTEM 300

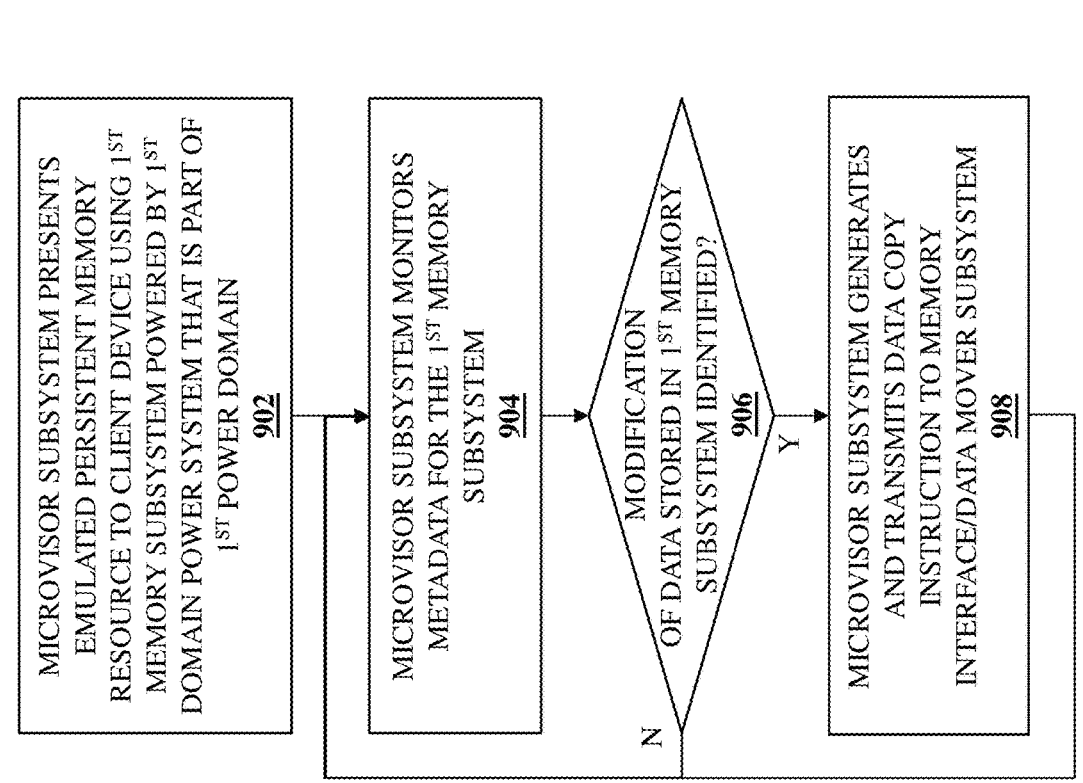

900

MICROVISOR SUBSYSTEM PRESENTS EMULATED PERSISTENT MEMORY RESOURCE TO CLIENT DEVICE USING 1ST MEMORY SUBSYSTEM POWERED BY 1ST DOMAIN POWER SYSTEM THAT IS PART OF 1ST POWER DOMAIN
902

MICROVISOR SUBSYSTEM MONITORS METADATA FOR THE 1ST MEMORY SUBSYSTEM
904

MODIFICATION OF DATA STORED IN 1ST MEMORY SUBSYSTEM IDENTIFIED?
906

N

Y

MICROVISOR SUBSYSTEM GENERATES AND TRANSMITS DATA COPY INSTRUCTION TO MEMORY INTERFACE/DATA MOVER SUBSYSTEM
908

FIG. 9

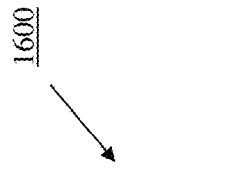
FIG. 16
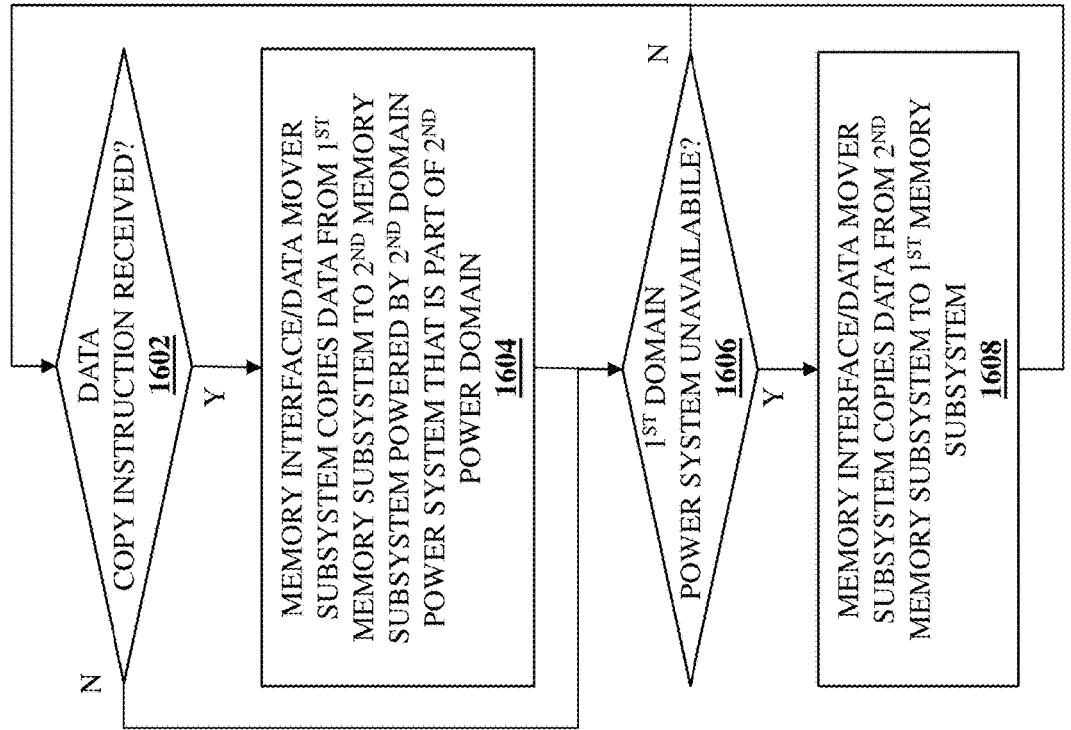

MULTI-POWER-DOMAIN EMULATED PERSISTENT MEMORY RESOURCE SYSTEM

BACKGROUND

The present disclosure relates generally to information handling systems, and more particularly to emulating a persistent memory resource for an information handling system using memory subsystems in multiple power domains.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices (e.g., "Bare Metal Servers (BMSs)) and/or other computing devices known in the art, are often utilized to perform workloads. For example, a user or administrator may provide a request to perform a workload, a server device may be selected for performing that workload, and the resources of that server device may then be subsequently used to perform that workload. The performance of such workloads can sometimes be enhanced via the use of persistent memory resources. For example, storage services performed as part of a workload may be enhanced via the use of a persistent memory device such as a Non-Volatile Dual Inline Memory Module (NVDIMM) device that may be used to cache, journal, and/or otherwise store data destined for a storage system. In particular, data included in "random" write operations may be accumulated in the NVDIMM device, and that accumulated data may then be written to the storage system as part of a large, sequential write operation in order to improve latency, amplification, and/or other characteristics of write operations to the storage system.

As will be appreciated by one of skill in the art, NVDIMM devices are provided by specially designed hardware that uses volatile memory device(s) to store data during "normal" operations and, in the event power becomes unavailable to the volatile memory device(s), "dumps" or otherwise copies that data from the volatile memory device(s) to other memory device(s) while powered via an "on-board"/backup power source. However, NVDIMM devices are not generally provided in common server devices (e.g., server devices provided by common "cloud" platforms and/or utilized as described above), which limits the use of the NVDIMM-dependent storage service functionality in the deployments of the storage services described above. For example, in such server devices the NVDIMM-dependent storage service functionality described above may be disabled, or those server devices may utilize Solid State Drive (SSD) storage devices to cache, journal, and/or otherwise perform the storage service functionality described as being provided by the NVDIMM devices above. However, one of skill in the art will appreciate how the use of SSD storage devices to perform the storage service functionality described above is associated with much lower performance and efficiency (e.g., as the SSD storage devices do not provide the byte-level addressing functionality of NVDIMM devices, and instead use block-level address functionality that is much less efficient).

Accordingly, it would be desirable to provide a persistent memory resource provisioning system that addresses the issues discussed above.

SUMMARY

According to one embodiment, an Information Handling System (IHS) includes a microvisor processing system; and a microvisor memory system that is coupled to the microvisor processing system and that includes instructions that, when executed by the microvisor processing system, cause the microvisor processing system to provide a microvisor engine that is configured to: present, to a client device using a first memory subsystem that is coupled to the microvisor processing system and that is configured to receive power from a first domain power system that is part of a first power domain, an emulated persistent memory resource; monitor metadata for the first memory subsystem; identify, based on the monitoring of the metadata for the first memory subsystem, a modification of data stored in the first memory subsystem; generate, in response to identifying the modification of the data stored in the first memory subsystem, a data copy instruction that is configured to cause a memory interface/data mover engine to copy the data from the first memory subsystem to a second memory subsystem that is configured to receive power from a second domain power system that is part of a second power domain that is different than the first power domain; and transmit, to the memory interface/data mover engine, the data copy instruction.

BRIEF DESCRIPTION OF THE DRAWINGS

FIG. 9 is a flow chart illustrating an embodiment of a method for emulating a persistent memory resource using memory subsystems in multiple power domains.

FIG. 16 is a flow chart illustrating an embodiment of a method for emulating a persistent memory resource using memory subsystems in multiple power domains.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
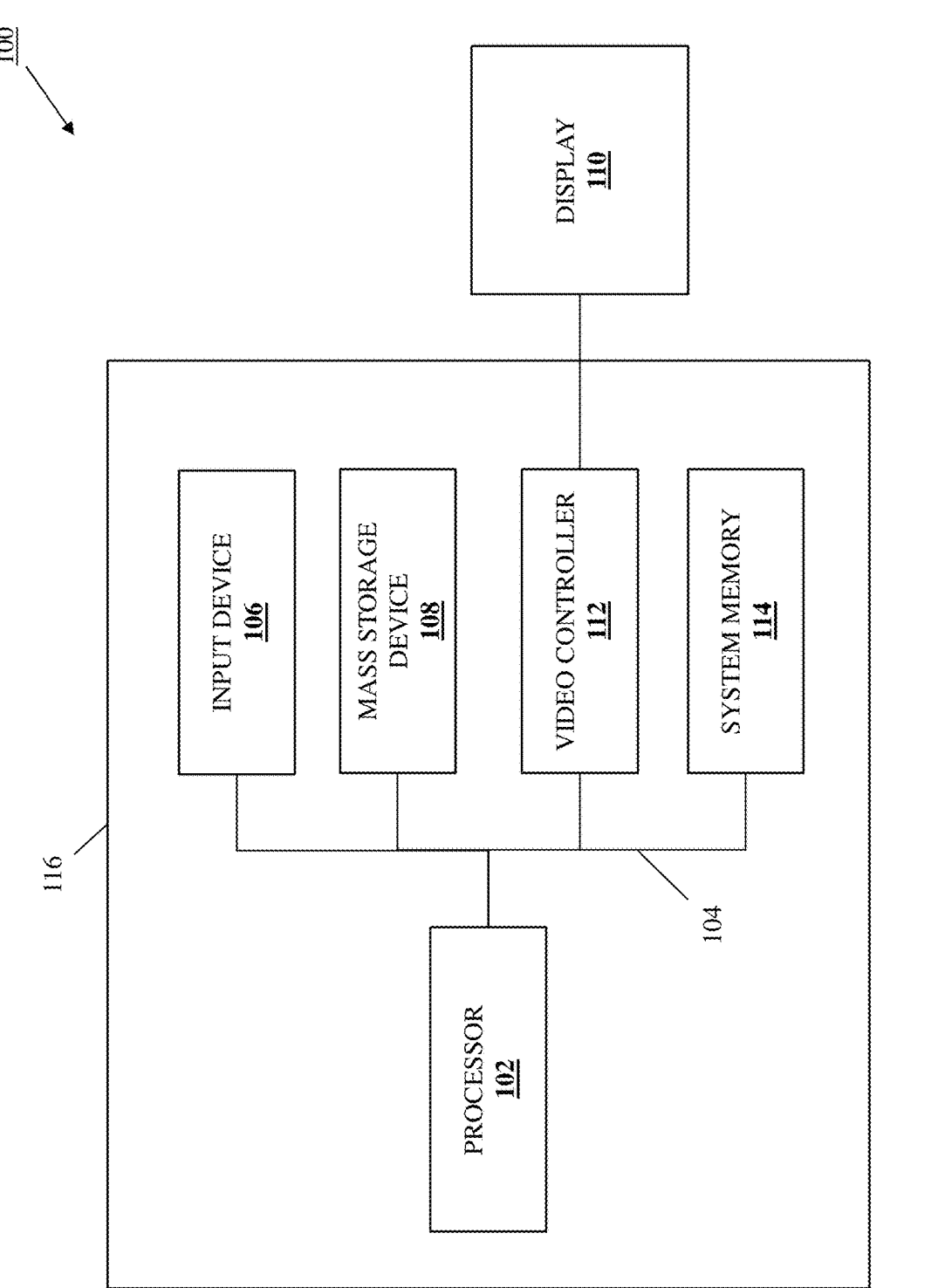
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the multi-power-domain emulated persistent memory resource systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
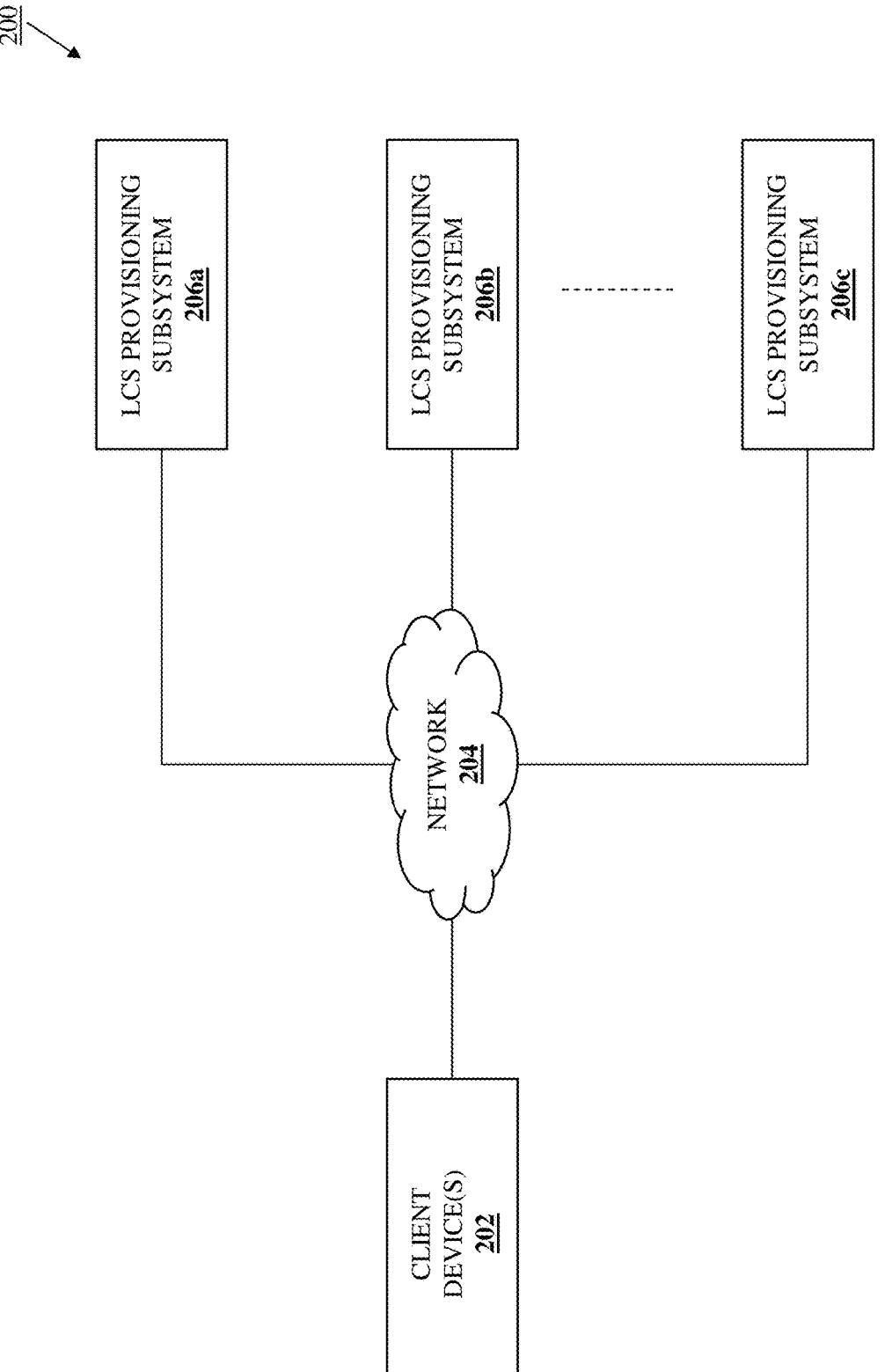
FIG. 2 is a schematic view illustrating an embodiment of an LCS provisioning system.

With reference to FIG. 2, an embodiment of a Logically Composed System (LCS) provisioning system 200 is illustrated that may be utilized with the multi-power-domain emulated persistent memory resource systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/ notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem discussed below may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
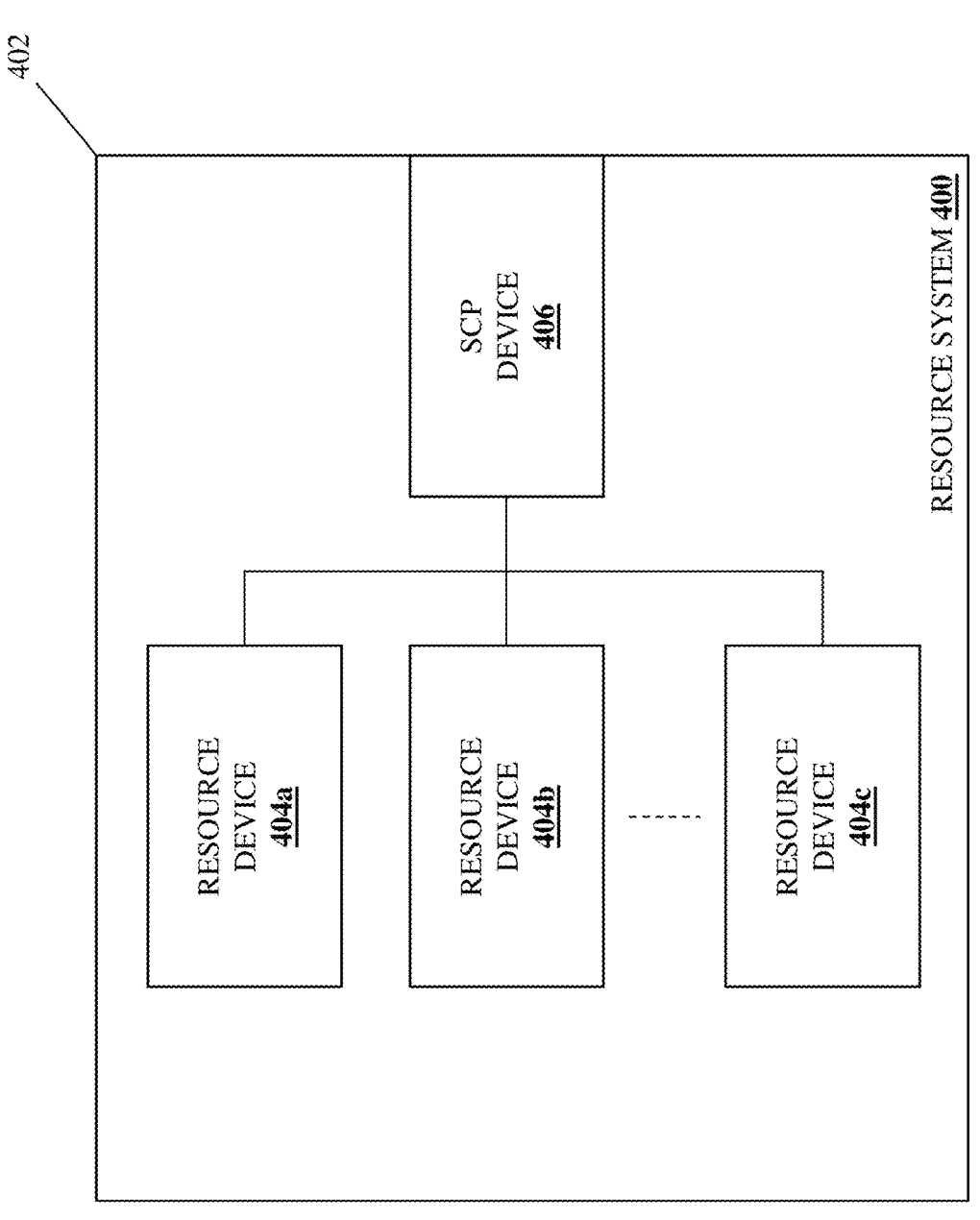
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciate that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
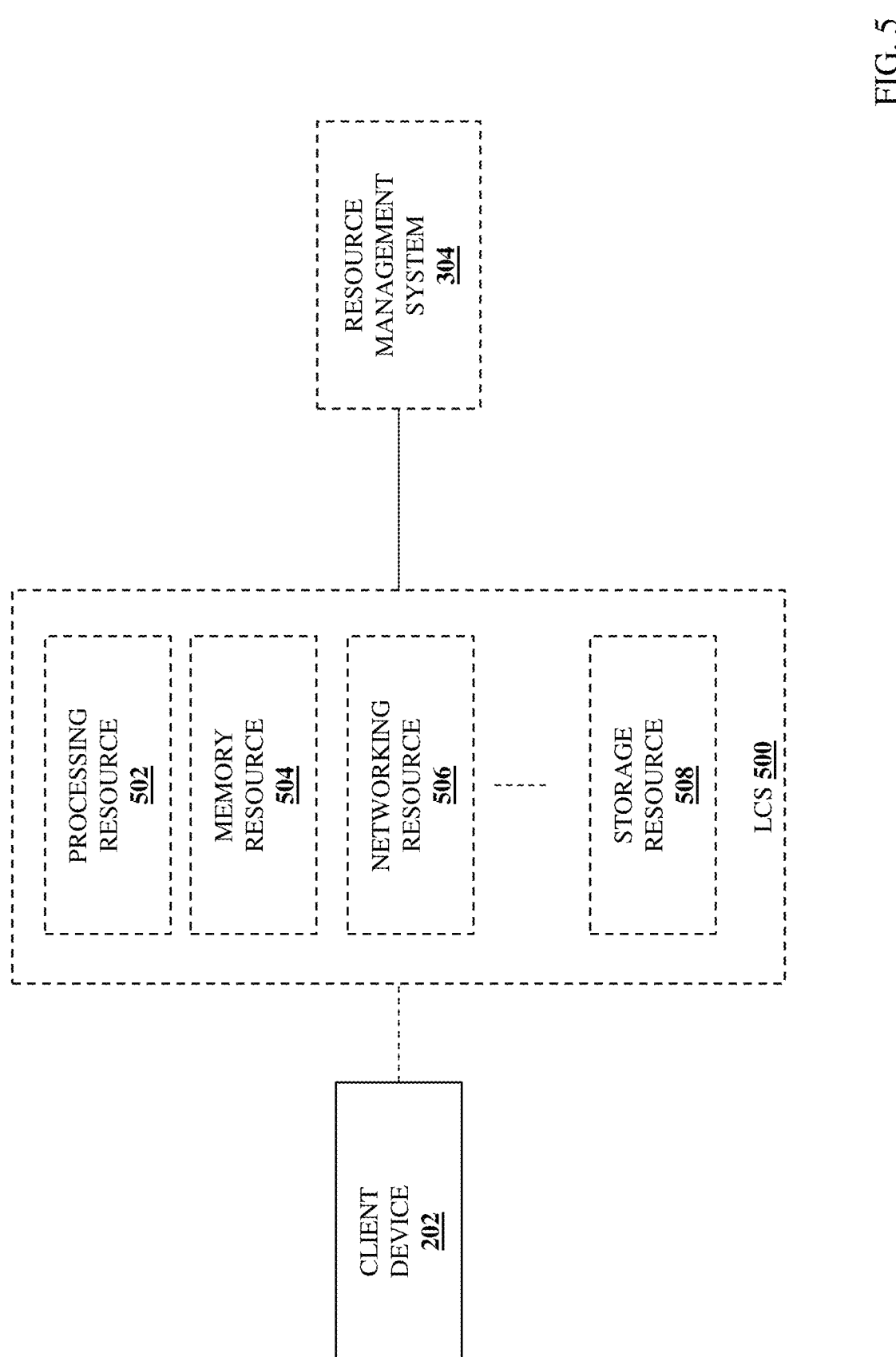
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
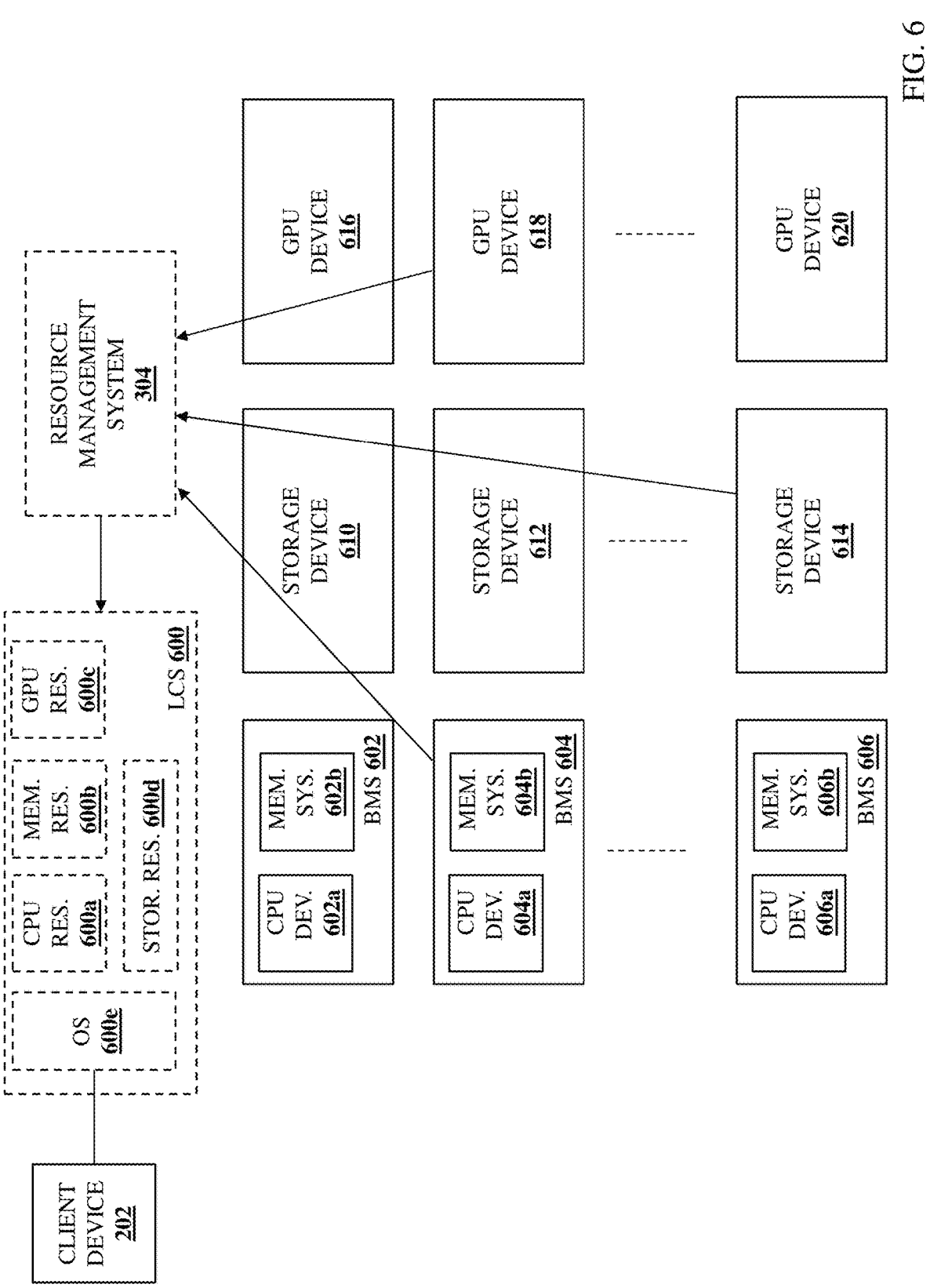
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600*d*, and using the GPU device 318 to provide the LCS 600 with GPU resources 600*c*. As illustrated in the specific example in FIG. 6, the CPU device 604*a* and the memory system 604*b* in the BMS 604 may be configured to provide an operating system 600*e* that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/ CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/ time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
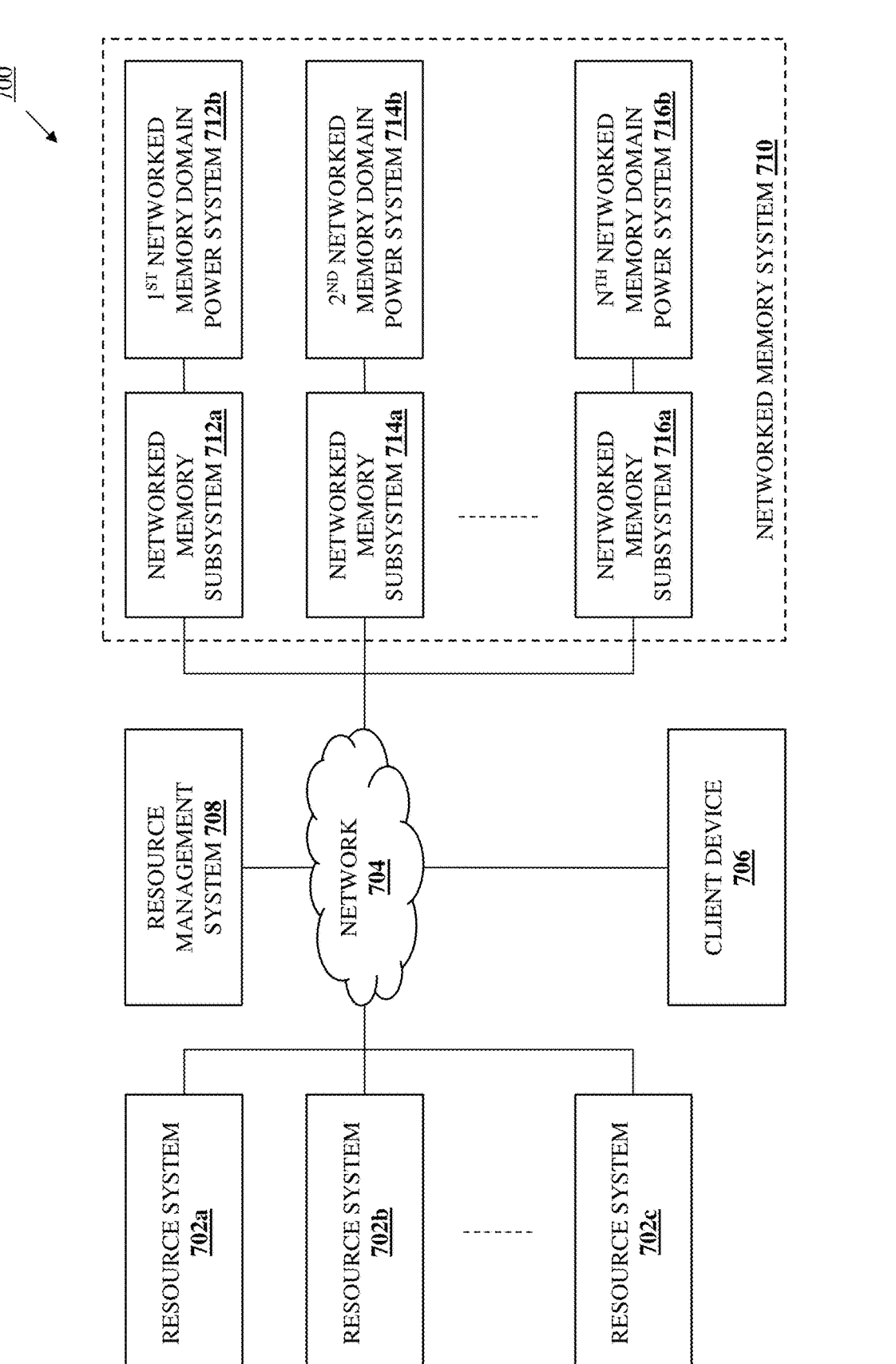
FIG. 7 is a schematic view illustrating an embodiment of a networked system that may provide the multi-power-domain emulated persistent memory resource system of the present disclosure.

Referring now to FIG. 7, an embodiment of a networked system 700 is illustrated that may provide the multi-power-domain emulated persistent memory resource system of the present disclosure. In the illustrated embodiment, the networked system 700 may be provided using the LCS provisioning system 200 described above with reference to FIG. 2 and the LCS provisioning subsystem described above with reference to FIG. 3, and may operate similarly as described with reference to FIGS. 5 and 6. The networked system 700 includes a plurality of resource systems 702*a*, 702*b*, and up to 702*c* that may be provided by the resource systems 306*a*, 306*b*, and up to 306*c* described above with reference to FIG. 3 and the resource system 400 described above with reference to FIG. 4. In the illustrated embodiment, the resource systems 702*a*-702*c* are coupled to a network 704 that may be provided by a Local Area Network (LAN), the Internet, combinations thereof, and/or any other network that would be apparent to one of skill in the art in possession of the present disclosure.

In the illustrated embodiment, the networked system 700 includes a client device 706 that is coupled to the network 704 and that may be provided by any of the client device(s) 202 described above with reference to FIG. 2. The networked system 700 also includes a resource management system 708 that is coupled to the network 704 and that may be provided by the resource management system 304 of FIGS. 3, 5, and/or 6. Finally, the networked system 700 includes a networked memory system 710 that is coupled to the network 704 and that includes networked memory subsystems that may provide any of the resource devices 404*a*-404*c* of FIG. 4; that may be included in the BMSs 602, 604, and 606, respectively, of FIG. 6; and/or that may be provided by any other memory resource devices described above.

In the specific example illustrated in FIG. 7, the networked memory system 710 includes a networked memory subsystem 712*a* that may include one or more memory devices that are coupled to a 1$^{st}$ networked memory domain power system 712*b*, a networked memory subsystem 714*a* that may include one or more memory devices that are coupled to a 2$^{nd}$ networked memory domain power system 714$b$, and up to a networked memory subsystem 716$a$ that may include one or more memory devices that are coupled to a $N^{th}$ networked memory domain power system 716$b$. In a specific example, each of the memory devices in the networked memory subsystems 712$a$, 714$a$, and up to 716$a$ may be provided by volatile memory devices such as, for example, Dynamic Random Access Memory (DRAM) devices, although one of skill in the art in possession of the present disclosure will appreciate how other types of memory devices will fall within the scope of the present disclosure as well.

Furthermore, each of the 1$^{st}$ networked memory domain power system 712$b$, the 2$^{nd}$ networked memory domain power system 714$b$, and the $N^{th}$ networked memory domain power system 716$b$ may be part of a separate power domain (e.g., corresponding 1$^{st}$, 2$^{nd}$, and up to $N^{th}$ networked memory power domains) such that the unavailability of a particular power domain does not affect power supplied to networked memory subsystems that are coupled to a networked memory power system that is not part of that particular power domain (e.g., such that the unavailability of the 1$^{st}$ networked memory power domain provided by the 1$^{st}$ networked memory power domain power system, which will affect power supplied to the networked memory subsystem 712$a$ coupled to the 1$^{st}$ domain networked memory power system, does not affect power supplied to the networked memory subsystems 714$a$-716$a$).

To provide a specific example, the 1$^{st}$ networked memory domain power system 712$b$, the 2$^{nd}$ networked memory domain power system 714$b$, and up to the $N^{th}$ networked memory domain power system 716$b$ may each be provided by a respective Power Supply Unit (PSU) that supplies power to the networked memory subsystems 712$a$, 712$b$, and up to 712$c$, respectively, and thus provides the 1$^{st}$, 2$^{nd}$, and up to $N^{th}$ networked memory power domain, respectively, for the networked memory subsystems 712$a$, 712$b$, and up to 712$c$, respectively. As such, the failure of the PSU provided by any one of the 1$^{st}$ networked memory domain power system 712$b$, the 2$^{nd}$ networked memory domain power system 714$b$, and up to the $N^{th}$ networked memory domain power system 716$b$ will not affect the power supplied to the networked memory subsystems coupled to the PSUs provided by the others of the 1$^{st}$ networked memory domain power system 712$b$, the 2$^{nd}$ networked memory domain power system 714$b$, and up to the $N^{th}$ networked memory domain power system 716$b$.

However, one of skill in the art in possession of the present disclosure will appreciate how two or more of the 1$^{st}$ networked memory domain power system 712$b$, the 2$^{nd}$ networked memory domain power system 714$b$, and up to the $N^{th}$ networked memory domain power system 716$b$ may both provide a distinct power domain while being included in a common power domain. For example, the 1$^{st}$ networked memory domain power system 712$b$ and the 2$^{nd}$ networked memory domain power system 714$b$ may each be provided by a respective PSU that supplies power to the networked memory subsystems 712$a$ and 712$b$, respectively, and thus provides the 1$^{st}$ and 2$^{nd}$ networked memory power domain, respectively, for the networked memory subsystems 712$a$ and 712$b$, respectively, while a rack power system may power the PSUs provided by the 1$^{st}$ networked memory domain power system 712$b$ and the 2$^{nd}$ networked memory domain power system 714$b$, thus providing a 3$^{rd}$ networked memory power domain that includes the 1$^{st}$ networked memory domain power system 712$b$ and the 2$^{nd}$ networked memory domain power system 714$b$. However, while a few specific examples have been provided, one of skill in the art in possession of the present disclosure will appreciate how power domains may be provided in the networked memory system 710 in a variety of manners that will fall within the scope of the present disclosure as well.

Figure 8:
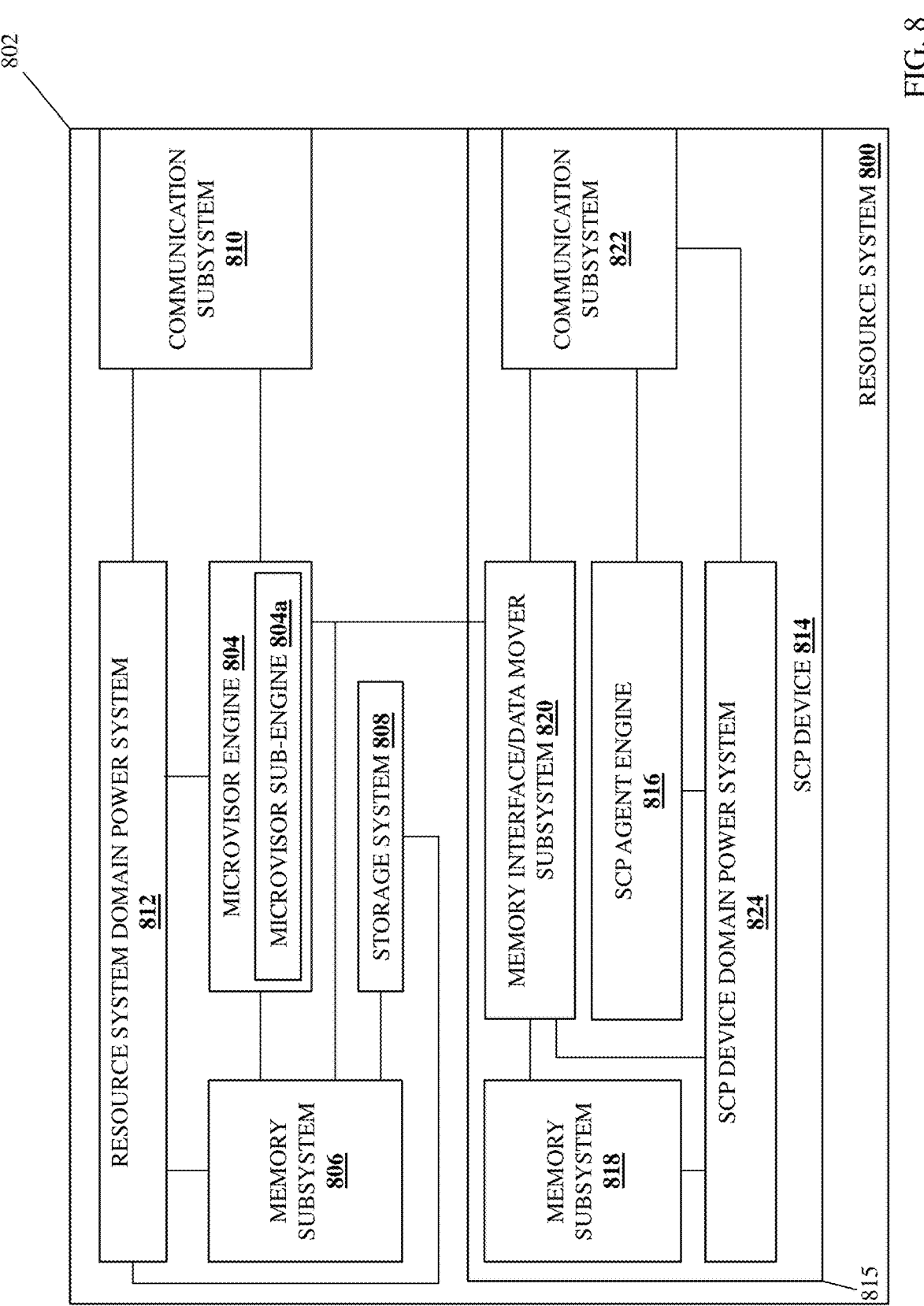
FIG. 8 is a schematic view illustrating an embodiment of a resource system that may include the multi-power-domain emulated persistent memory resource system of the present disclosure.

Referring now to FIG. 8, an embodiment of a resource system 800 is illustrated that may include the multi-power-domain emulated persistent memory resource system of the present disclosure, and that may provide any of the resource systems 702$a$-702$c$ discussed above with reference to FIG. 7. As such, the resource system 800 may be provided by the resource systems 306$a$, 306$b$, and up to 306$c$ described above with reference to FIG. 3 and/or the resource system 400 described above with reference to FIG. 4, and in specific examples may be provided by a BMS. However, while illustrated and described as being provided by a BMS, one of skill in the art in possession of the present disclosure will appreciate how the resource system 800 may be provided by a variety of computing devices while remaining within the scope of the present disclosure as well. In the illustrated embodiment, the resource system 800 includes a chassis 802 that houses the components of the resource system 800, only some of which are illustrated and described below.

For example, the chassis 302 may house a microvisor processing system (not illustrated, but which may include the processor 102 discussed above with reference to FIG. 1 such as a CPU) and a microvisor memory system (not illustrated, but which may include the memory 114 discussed above with reference to FIG. 1) that is coupled to the microvisor processing system and that includes instructions that, when executed by the microvisor processing system, cause the microvisor processing system to provide a microvisor engine 804 that is configured to provide a microvisor as part of an operating system that is included in the resource system 800, and/or perform any of the other functionality of the microvisor engines and/or microvisor subsystems discussed below.

In the illustrated embodiments, the microvisor memory system includes instructions that, when executed by the microvisor processing system, cause the microvisor processing system to provide a microvisor sub-engine 804$a$ that, in the specific examples described below, is configured to provide a System Control Processor (SCP) agent that is configured to perform the communications discussed below with an SCP device that provides the resource management system 708 described above, a persistent memory resource emulator that is configured to emulate a persistent memory resource as described below, and/or any other components that one of skill in the art in possession of the present disclosure would recognize as being configured to perform the persistent memory resource emulation functionality discussed below.

The chassis 802 may also house a memory subsystem 806 that is coupled to the microvisor engine 804 (e.g., via a coupling between the memory subsystem 806 and the microvisor processing system) and that may include one or more memory devices that may provide any of the resource devices 404$a$-404$c$ of FIG. 4; that may be included in the BMSs 602, 604, and 606, respectively, of FIG. 6; and/or that may be provided by any other memory resource devices described above. In a specific example, each of the memory devices in the memory subsystem 806 may be provided by volatile memory devices such as, for example, DRAM devices, although one of skill in the art in possession of the present disclosure will appreciate how other types of memory devices will fall within the scope of the present disclosure as well.

The chassis 302 may also house a storage system 808 that is coupled to the microvisor engine 804 (e.g., via a coupling between the storage system 808 and the microvisor processing system). As discussed in the specific examples provided below, the storage system 808 may be configured to perform storage services that may enhance the performance a workload via the use of the emulated persistent memory resource of the present disclosure to cache, journal, and/or otherwise store data destined for the storage system 808 (e.g., data included in "random" write operations may be accumulated in the emulated persistent memory resource of the present disclosure, and that accumulated data may then be written to the storage system 808 as part of a large, sequential write operation in order to improve latency, amplification, and/or other characteristics of write operations to the storage system 808). However, while a particular use of the emulated persistent memory resource of the present disclosure by the storage system 808 is illustrated and described, one of skill in the art in possession of the present disclosure will appreciate how other uses of the emulated persistent memory resource of the present disclosure (e.g., use of the emulated persistent memory resource of the present disclosure for the storage of transaction logs that may subsequently be reviewed to determine the cause of an error or in the event of a power loss, use of the emulated persistent memory resource of the present disclosure as a persistent write cache, etc.) will fall within the scope of the present disclosure as well.

In the illustrated embodiment, the chassis 802 also houses a communication subsystem 810 that is coupled to the microvisor engine 804 (e.g., via a coupling between the communication subsystem 810 and the microvisor processing system) and that may include a Network Interface Controller (NIC), a wireless communication system (e.g., BLUETOOTH® devices, Near Field Communication (NFC) devices, etc.), and/or other communication components that one of skill in the art in possession of the present disclosure would recognize as being configured to couple to the network 704 described above to allow the microvisor engine 804 to communicate via the network 704.

As illustrated, the chassis 802 may house a resource system domain power system 812 that is coupled to (and configured to supply power to) each of the microvisor engine 804 (e.g., via a coupling between the resource system domain power system 812 and the microvisor processing system), the memory subsystem 806, the storage system 808, and the communication subsystem 810. As discussed in further detail below, the resource system domain power system 812 may be part of a separate power domain (e.g., a resource system power domain) such that the unavailability of the resource system domain power system 812/resource system power domain only affects power supplied to the microvisor engine 804, the memory subsystem 806, the storage system 808, the communication subsystem 810, as well as any other components in the chassis 802 that are coupled to and configured to receive power from the resource system domain power system 812.

The chassis 802 may also house an SCP device 814 that may be provided by the SCP device 406 discussed above with reference to FIG. 4. As illustrated, the SCP device 814 may include a chassis 815 (e.g., a circuit board) that supports the components of the SCP device 814, only some of which are illustrated and described below. For example, the chassis 815 may support an SCP processing system (not illustrated, but which may be similar to the processor 102 discussed above with reference to FIG. 1) and an SCP memory system (not illustrated, but which may be similar to the memory 114 discussed above with reference to FIG. 1) that is coupled to the SCP processing system and that includes instructions that, when executed by the SCP processing system, cause the SCP processing system to provide an SCP agent engine 806 that is configured to provide an SCP agent that is configured to perform the communications with the resource management system 708 discussed below, and/or perform any of the other functionality of the SCP agent engines and/or SCP devices discussed below.

The chassis 815 may also support a memory subsystem 818 that may include one or more memory devices that may be provided by any memory resource devices in the SCP devices described above. In a specific example, each of the memory devices in the memory subsystem 818 may be provided by volatile memory devices such as, for example, DRAM devices, although one of skill in the art in possession of the present disclosure will appreciate how other types of memory devices will fall within the scope of the present disclosure as well. The chassis 815 may also support a memory interface/data mover subsystem 820 that is coupled to the memory subsystem 818. In a specific example, the memory interface/data mover subsystem 820 may be provided by a Smart Data Acceleration Interface (SDXI) subsystem, which one of skill in the art in possession of the present disclosure will recognize provides a memory-to-memory data movement and acceleration interface defined by the Storage Network Industry Association (SNIA) SDXI specification. However, while a specific memory interface/data mover subsystem is described below, one of skill in the art in possession of the present disclosure will appreciate how the functionality of the memory interface/data mover subsystem 820 may be enabled using a variety of techniques that will fall within the scope of the present disclosure as well.

In the illustrated embodiment, the chassis 815 also supports a communication subsystem 822 that is coupled to the SCP agent engine 816 (e.g., via a coupling between the communication subsystem 822 and the SCP processing system) and the memory interface/data mover subsystem 820, and that may include a NIC, a wireless communication system (e.g., BLUETOOTH® devices, NFC devices, etc.), and/or other communication components that one of skill in the art in possession of the present disclosure would recognize as being configured to couple to the network 704 described above to allow the SCP agent engine 816 and the memory interface/data mover subsystem 820 to communicate via the network 704. As illustrated, the chassis 815 may also support an SCP device domain power system 824 that is coupled to (and configured to supply power to) each of the SCP agent engine 816 (e.g., via a coupling between the SCP device domain power system 824 and the SCP processing system), the memory subsystem 818, the memory interface/data mover subsystem 820, and the communication subsystem 822. As discussed in further detail below, the SCP device domain power system 824 may be part of a separate power domain (e.g., an SCP device power domain) such that the unavailability of the SCP device domain power system 824/SCP device power domain only affects power supplied to the SCP agent engine 816, the memory subsystem 818, the memory interface/data mover subsystem 820, and the communication subsystem 822, as well as any other components on the chassis 815 that are coupled to and configured to receive power from the SCP device domain power system 824.

To provide a specific example, the resource system domain power system 812 and the SCP device domain power system 824 may each be provided by a respective Power Supply Unit (PSU) that supplies power to its connected components (e.g., the microvisor engine 804, the memory subsystem 806, the storage system 808, and the communication subsystem 810 for the resource system domain power system 812; and the SCP agent engine 816, the memory subsystem 818, the memory interface/data mover subsystem 820, and the communication subsystem 822 for the resource system domain power system 812), and thus provides a resource system power domain for component in the resource system 800, and a separate SCP device power domain for components on the SCP device 814. As such, the failure of the PSU provided by either of the resource system domain power system 812 and the SCP device domain power system 824 will not affect the power supplied to the components coupled to the PSU provided by the other. In other words, the components of the resource system 800 (e.g., a BMS) may be provided power via a power domain that is different than the power domain that powers the components of the SCP device 814.

However, one of skill in the art in possession of the present disclosure will appreciate how the resource system domain power system 812 and the SCP device domain power system 824 may each provide a distinct power domain while being included in a common power domain. For example, the resource system domain power system 812 and the SCP device domain power system 824 may each be provided by a respective PSU that supplies power to their connected components, and thus provides the separate resource system power domain and SCP device power domain discussed above, while a rack power system may power the PSUs provided by resource system domain power system 812 and the SCP device domain power system 824, thus providing a rack power domain that includes the resource system domain power system 812 and the SCP device domain power system 824. In other words, different power systems utilized by the components in the resource system 800 and the SCP device 814 may provide independent power domains, while also being included in a common power domain, which as discussed below may be a policy consideration when emulating persistent memory resources. However, while a few specific examples have been provided, one of skill in the art in possession of the present disclosure will appreciate how power domains may be provided in the resource system 800 in a variety of manners that will fall within the scope of the present disclosure as well.

Furthermore, while a specific resource system 800 has been illustrated and described, one of skill in the art in possession of the present disclosure will recognize that resource systems (or other devices operating according to the teachings of the present disclosure in a manner similar to that described below for the resource systems 800) may include a variety of components and/or component configurations for providing conventional resource system functionality, as well as the multi-power-domain emulated persistent memory resource functionality discussed below, while remaining within the scope of the present disclosure as well.

Thus, FIGS. 7 and 8 illustrated how the multi-power-domain emulated persistent memory resource system may include a plurality of different memory subsystems (e.g., the memory subsystems 806 in the resource system 800, the memory system 818 on the SCP device 814 included in the resource system 800, and the memory subsystems 712a, 714a, and up to 716a in the networked memory system 710) that are each configured to receive power from a respective power system (e.g., the resource system domain power system 812, the SCP device domain power system 824, and the 1$^{st}$, 2$^{nd}$, and up to N$^{th}$ networked memory domain power systems 712b, 714b, and up to 716b, respectively) that provides a respective power domain (e.g., the resource system power domain, the SCP device power domain, and the 1$^{st}$, 2$^{nd}$, and up to N$^{th}$ networked memory power domain, respectively) such that each memory subsystem is powered via an independent power domain that prevents the unavailability of any of those respective power systems from affecting the power supplied to memory subsystems that are not coupled to or otherwise configured to receive power from that power system.

Referring now to FIG. 9, an embodiment of a method 900 for emulating a persistent memory resource using memory subsystems in multiple power domains is illustrated. As discussed below, the systems and methods of the present disclosure provide for the emulation of a persistent memory resource using memory subsystems in different power domains. For example, the multi-power-domain emulated persistent memory resource system of the present disclosure may include a memory interface/data mover subsystem coupled to a second memory subsystem in a second power domain, and a microvisor subsystem coupled to the memory interface/data mover subsystem and a first memory subsystem in a first power domain that is different than the second power domain. The microvisor subsystem presents an emulated persistent memory resource to a client device using the first memory subsystem, and monitors metadata for the first memory subsystem to identify modification(s) of data in the first memory subsystem. In response to identifying the modification of the data stored in the first memory subsystem, the microvisor subsystem generates a data copy instruction that is configured to cause a memory interface/data mover subsystem to copy the data from the first memory subsystem to the second memory subsystem, and transmits the data copy instruction to the memory interface/data mover subsystem to cause it to copy the data from the first memory subsystem to the second memory subsystem. As such, NVDIMM-dependent storage service functionality may be enabled for storage services provided with resource systems that do not include NVDIMM devices.

Figure 10:
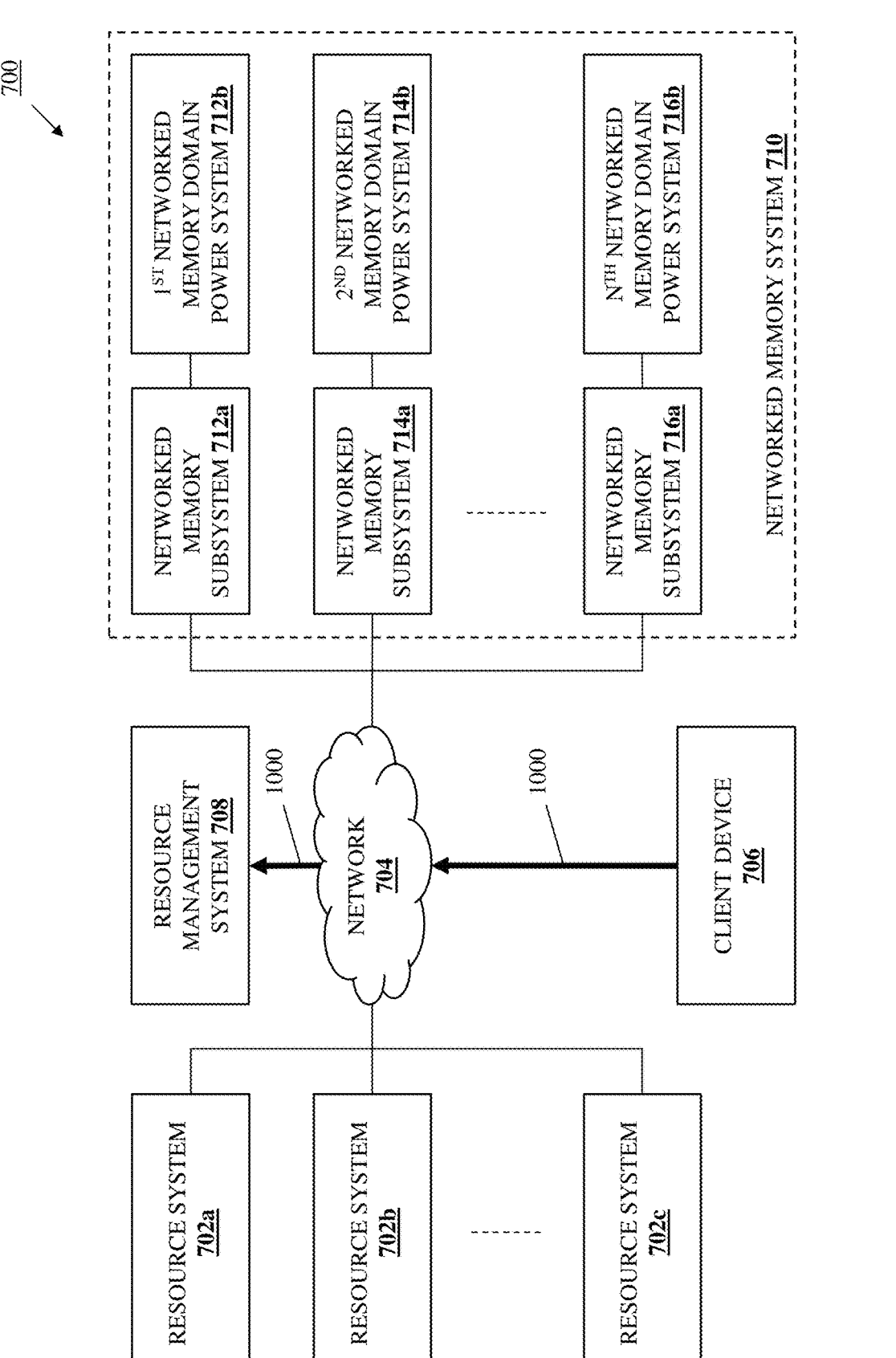
FIG. 10 is a schematic view illustrating an embodiment of the networked system of FIG. 7 operating during the method of FIG. 9.

The method 900 begins at block 902 where a microvisor subsystem presents an emulated persistent memory resource to a client device using a first memory subsystem powered by a first domain power system that is part of a first power domain. With reference first to FIG. 10, in an embodiment of block 902, the client device 706 may perform workload request operations 1000 that may include generated and transmitting a workload intent via the network 704 to the resource management system 708 similarly as described above. In the embodiments provided below, the workload intent generated and transmitting by the client device 706 at block 902 includes a request to provide a workload that includes storage services enhanced with NVDIMM-dependent storage service functionality, but one of skill in the art in possession of the present disclosure will appreciate how a variety of persistent-memory-dependent functionality may be utilized with other services and may be requested at block 902 while remaining within the scope of the present disclosure as well. Furthermore, one of skill in the art in possession of the present disclosure will appreciate how the teachings of the present disclosure may be applied to any requests for (or that require) persistent memory functionality while remaining within the scope of the present disclosure.

In response to receiving the workload intent at block 902, the resource management system 708 may compose an LCS substantially as described above, which in this embodiment may include identifying the storage system 808 in the resource system 702*b*/800 for use in providing the workload (e.g., providing the storage services for the workload) requested via the workload intent. However, while LCS provisioning/workload performance including persistent memory resources emulated according to the teaching of the present disclosure are illustrated and described below as utilizing the resource system 702*b*, one of skill in the art in possession of the present disclosure will appreciate how the other resource systems 702*a* and 702*c* may be utilized to provide LCSs, perform workloads, and/or emulate persistent memory resources as described below while remaining within the scope of the present disclosure as well.

Figure 11A:
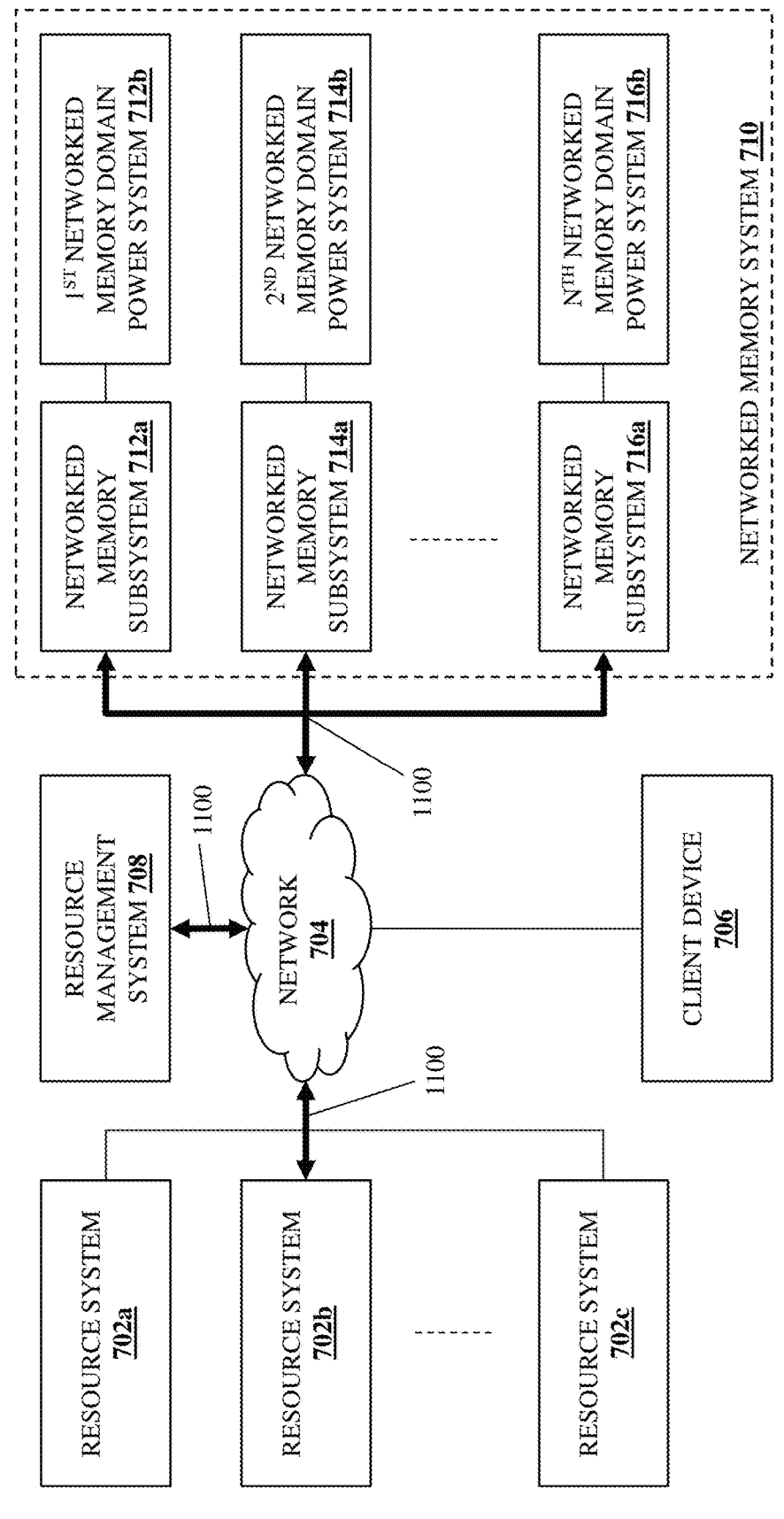
FIG. 11A is a schematic view illustrating an embodiment of the networked system of FIG. 7 operating during the method of FIG. 9.
Figure 11B:
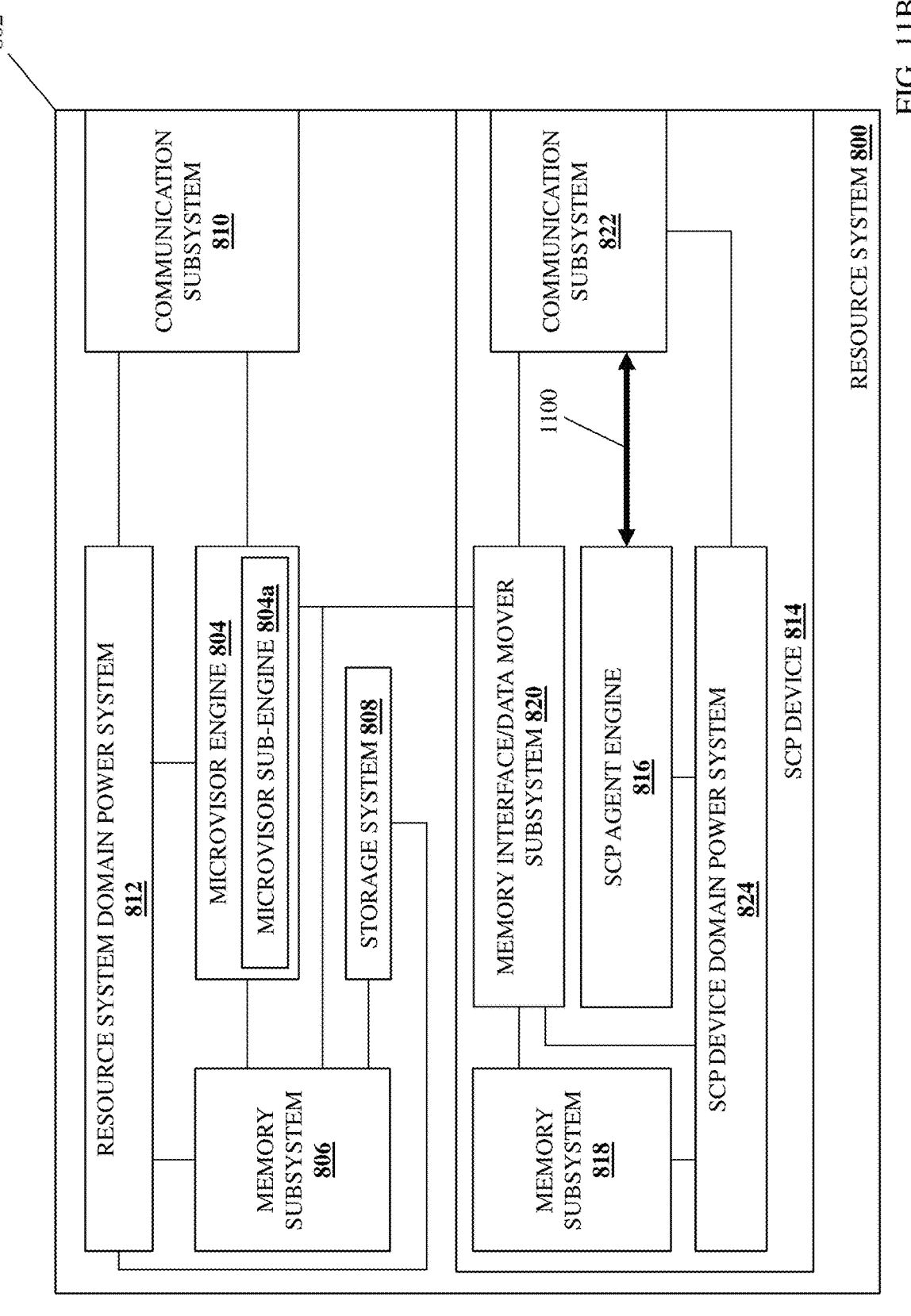
FIG. 11B is a schematic view illustrating an embodiment of the resource system of FIG. 8 operating during the method of FIG. 9.

With reference to FIGS. 11A and 11B, at block 902 and in response to receiving the workload intent, the resource management system 708 may then perform memory subsystem identification operations 1100 with the networked memory subsystem 716*a* and the SCP agent engine 816 in the resource system 702*b*/800 (e.g., via the communication subsystem 822 in the SCP device 814) to identify memory subsystems for use in emulating a persistent memory resource. As will be appreciated by one of skill in the art in possession of the present disclosure, the SCP agent engine 816 may maintain an inventory of the memory subsystems in the resource system 702*b*/800 (i.e., the memory subsystem 806 and the memory subsystem 818) and may report those memory subsystems as available resource devices to the resource management system 708, while the resource management system 708 may identify the networked memory subsystems 712*a*-716*a* in the networked memory system 710 as available resource devices via their connected SCP devices (not illustrated) and/or using a variety of resource device identification techniques known in the art. Furthermore, while the identification of memory subsystems as available resource devices is described as occurring after the receipt of a workload intent, one of skill in the art in possession of the present disclosure will appreciate how the resource management system 708 may identify memory subsystems and/or other resource devices prior to receiving workload intents while remaining within the scope of the present disclosure as well.

Similarly as described above, following the identification of resource devices and the receipt of a workload intent, the resource management system 708 may compose an LCS to perform the workload requested in the workload intent, which in the specific examples below include communicating with the SCP agent engine 816 on the SCP device 814 in the resource system 702*b*/800 to configure the memory subsystem 806 in the resource system 702*b*/800, the memory subsystem 818 on the SCP device 814, and the memory interface/data mover subsystem 820 on the SCP device 814, as well as communicating with the networked memory system 710 to configure the networked memory subsystem 716*a* (e.g., via communications with an SCP device coupled to the networked memory subsystem 716*a*, not illustrated), for use in providing an emulated persistent memory resource for the LCS as described in further detail below. However, while three memory subsystems are illustrated and described as being used to emulate a persistent memory resource in the examples below, one of skill in the art in possession of the present disclosure will appreciate how two memory subsystems, or more than three memory subsystems, may be used to emulate persistent memory resources according to the teachings of the present disclosure while remaining within its scope as well.

For example, the number of memory subsystems, the "degree" of power domain independence, and/or any other features of the memory subsystems configured for use in emulating the persistent memory resource of the present disclosure may be based on the details of the workload intent (e.g., an explicit request for persistent memory resource functionality, a request for a particular service or functionality that is defined as including persistent memory resource functionality, etc.), policies associated with the provisioning of LCSs and/or the performance of workloads, Service Level Agreements (SLAs) associated with a user providing the workload intent, etc.

As such, in some examples the persistent memory resource functionality of the present disclosure may be permitted to be enabled by the memory subsystems 806 and 818 included in the resource system 800 that may not be completely power-domain-independent (e.g., each may be powered via the separate resource system power domains provided by the resource system domain power system 812 and the SCP device power domain including the SCP device domain power system 824, but may also both be associated with a common power domain provided by a rack power domain that powers the resource system domain power system 812 and the SCP device domain power system 824 as described above). As such, persistent memory resource functionality may only require a degree of power domain independence associated with directly-connected power systems (i.e., each of the memory subsystems 806 and 818 will receive power when the directly-connected power system of the other becomes unavailable).

In other examples the persistent memory resource functionality of the present disclosure may be required to be enabled by one of the memory subsystems 806 and 818 included in the resource system 800 and one of the networked memory subsystems 712*a*-716*a* in the networked memory system 710 that are completely power-domain-independent. As such, persistent memory resource functionality may require a degree of power domain independence associated with its entire power supply chain (i.e., the one of the memory subsystems 806 and 818 and the networked memory subsystem 712*a*, 714*a*, or 716*a* will receive power when any of the power systems in the power supply chain of the other becomes unavailable). However, while a few specific examples of the use of memory subsystems powered via different power domains to provide the emulated persistent memory resource have been provided, one of skill in the art in possession of the present disclosure will appreciate how memory subsystems powered via different power domains may be used to provide the emulated persistent memory resource of the present disclosure in a variety of manners that will fall within the scope of the present disclosure as well. As such, one of skill in the art in possession of the present disclosure will appreciate how the emulated persistent memory resource described herein may be composed on demand (e.g., in response to receiving a workload intent) in a variety of manners, and may have DRAM-level performance when each of the memory subsystems used to provide it include DRAM devices.

Figure 12A:
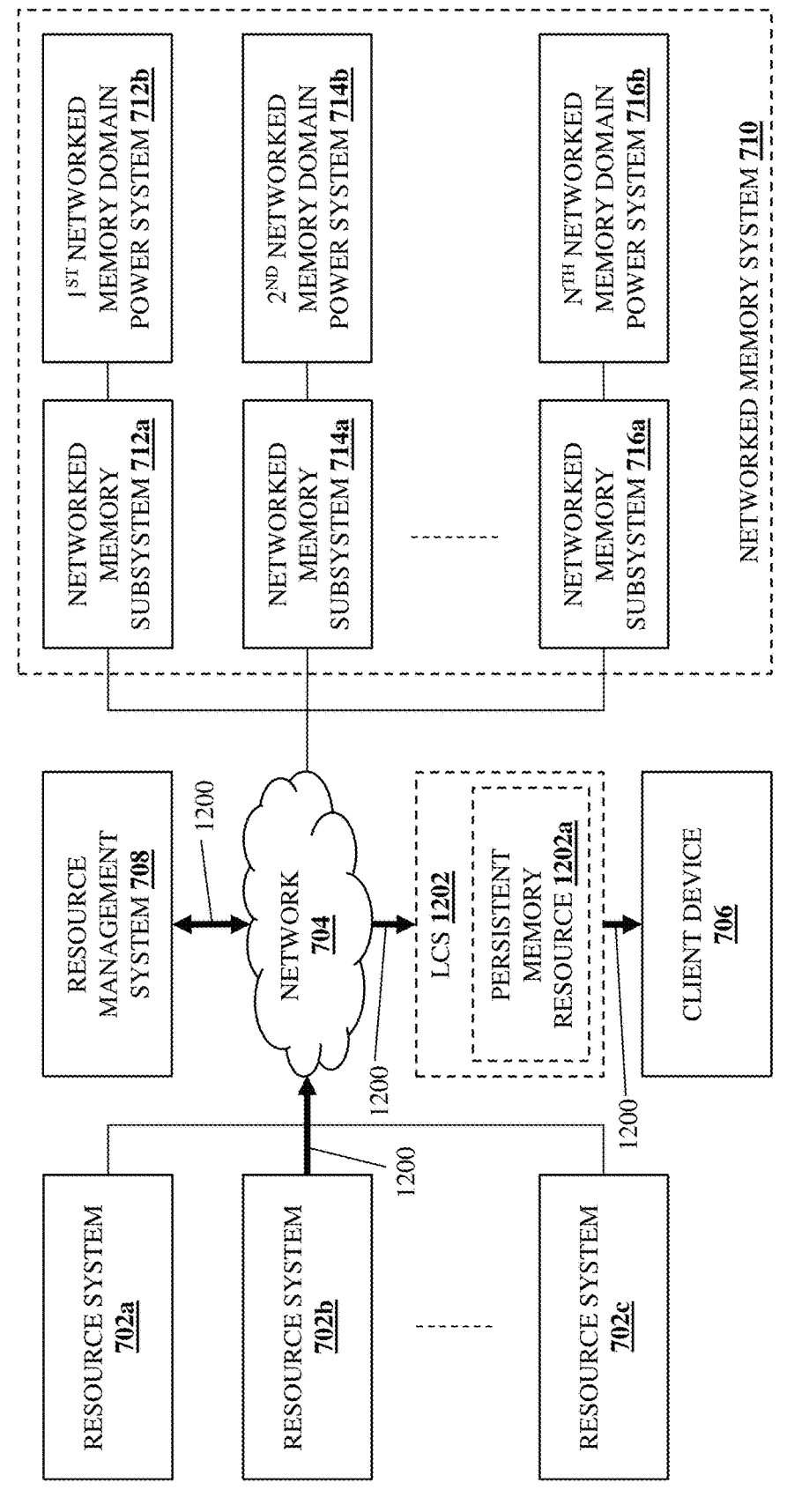
FIG. 12A is a schematic view illustrating an embodiment of the networked system of FIG. 7 operating during the method of FIG. 9.
Figure 12B:
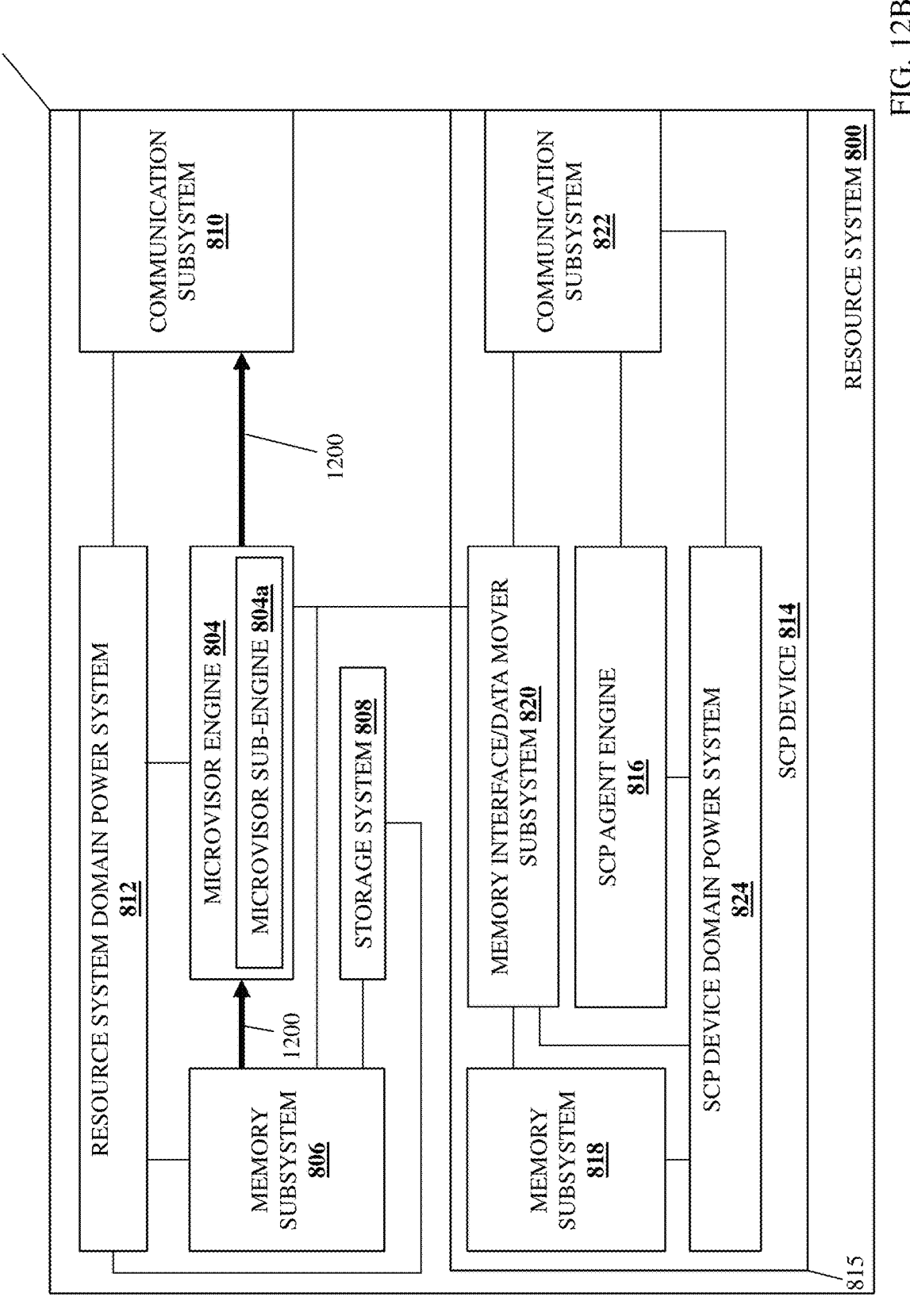
FIG. 12B is a schematic view illustrating an embodiment of the resource system of FIG. 8 operating during the method of FIG. 9.

With reference to FIGS. 12A and 12B, in an embodiment of block 902, the resource management system 708 and the microvisor sub-engine 804*a* in the microvisor engine 804 may then perform LCS provisioning operations 1200 that include providing an LCS 1202 via the network 704 to the client device 706 similar as described above, and emulating a persistent memory resource 1202*a* in the LCS 1202. In the specific examples below, the persistent memory source 1202*a* emulated for the LCS 1202 is illustrated and described as being provided by a virtual NVDIMM (vNVDIMM) in the LCS 1202, but one of skill in the art in possession of the present disclosure will appreciate how other persistent memory resources may be emulated at block 902 while remaining within the scope of the present disclosure as well. As such, one of skill in the art in possession of the present disclosure will appreciate how the client device 706 may utilize the LCS 1202 in any of a variety of manners to perform the workload requested in the workload intent received at block 902.

Figure 13:
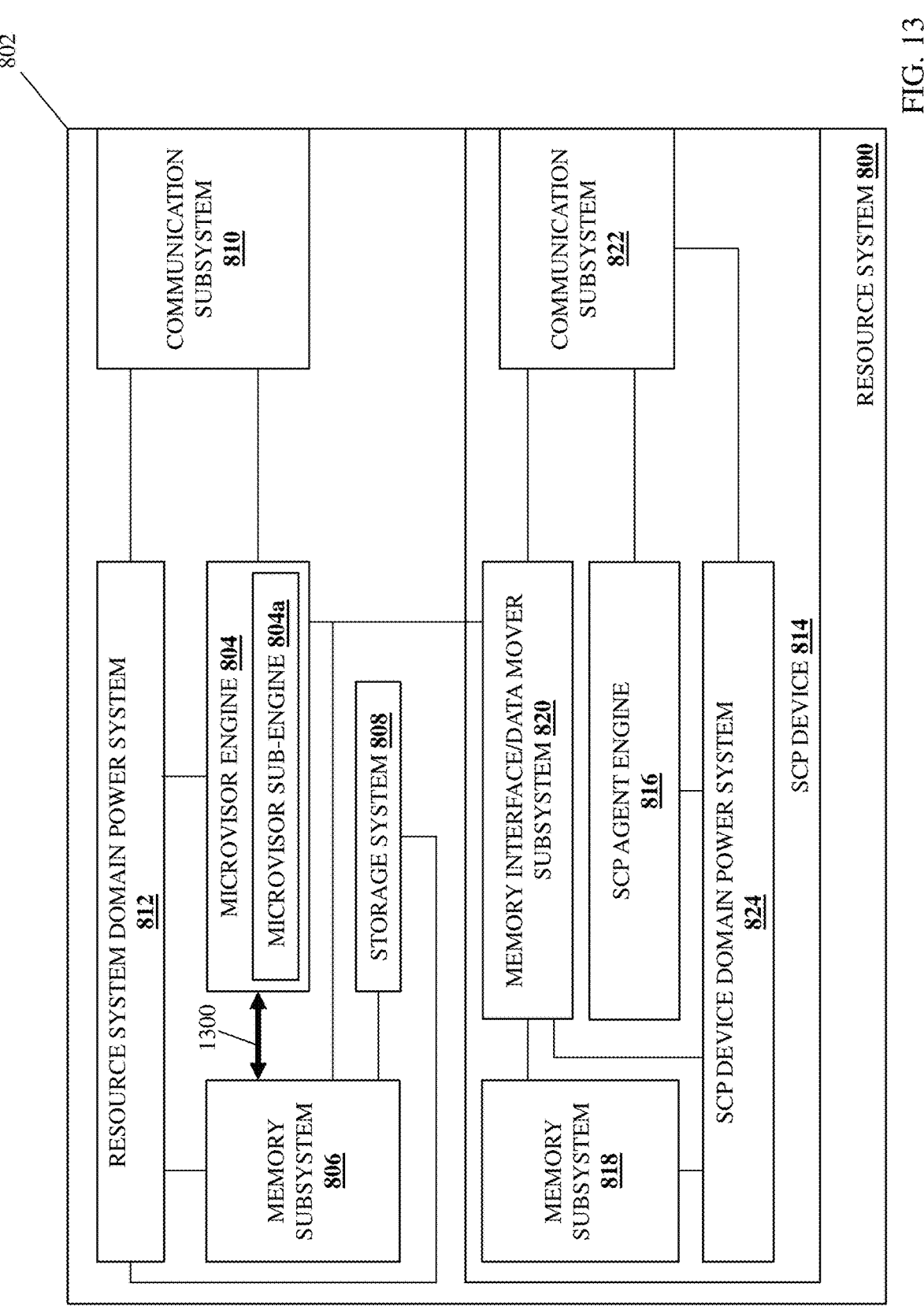
FIG. 13 is a schematic view illustrating an embodiment of the resource system of FIG. 8 operating during the method of FIG. 9.

The method 900 then proceeds to block 904 where the microvisor subsystem monitors metadata for the first memory subsystem. With reference to FIG. 13, in an embodiment of block 904, the microvisor sub-engine 804*a* in the microvisor engine 804 may perform memory subsystem monitoring operations 1300 that may include monitoring metadata in the memory subsystem 806 during the provisioning of the LCS 1200. As will be appreciated by one of skill in the art in possession of the present disclosure, the microvisor engine 804 may not be in a path between the memory subsystem 806 and a service that is configured to modify data in the memory subsystem 806 (e.g., as is the case with the storage system 808 as described herein), and thus the metadata monitoring may be performed by the microvisor engine 804 in order to identify when such data modifications occur.

In the examples provided below, the memory subsystem 806 is configured to provide a "primary" memory subsystem that is used to store data provided for storage in the persistent memory resource 1202*a* emulated for the LCS 1202, while the memory subsystem 818 and the networked memory subsystem 716*a* may be configured to provide "secondary" memory subsystems for the persistent memory resource 1202*a* emulated for the LCS 1202. However, one of skill in the art in possession of the present disclosure will appreciate how different memory subsystem configurations (e.g., configuring one the memory subsystem 818 and the networked memory subsystem 716*a* as the "primary" memory subsystem that is used to store data provided for storage to the persistent memory resource 1202*a* emulated for the LCS 1202) will fall within the scope of the present disclosure as well.

In a specific example, the memory subsystem monitoring operations 1300 performed by the microvisor sub-engine 804*a* in the microvisor engine 804 may include tracking bits in page table(s) for the memory subsystem 806 (e.g., which may be performed similarly to page table bit tracking performed by hypervisors during live-migration operations) in order to identify when data stored in the memory subsystem 806 has been modified. As will be appreciated by one of skill in the art in possession of the present disclosure, the page table bit tracking that provides the metadata monitoring described above by the microvisor sub-engine 804*a* may allow for the detection of "dirty" bits associated with pages have been written to in memory, and allows the microvisor sub-engine 804*a* to identify any modifications to data stored on the memory subsystem 806 that are performed independently of the microvisor engine 804 (e.g., like the microvisor-independent modifications of data on the memory subsystem 806 performed by the storage system 808 as described below). However, while a specific example of the monitoring of metadata for a memory subsystem has been described, one of skill in the art in possession of the present disclosure will appreciate how metadata may be monitored, and/or microvisor-independent data modifications in a memory subsystem may be identified, using a variety of techniques that will fall within the scope of the present disclosure as well.

The method 900 then proceeds to decision block 906 where the method 900 proceeds depending on whether a modification of data stored in the first memory subsystem is identified. In an embodiment, at decision block 906, the microvisor sub-engine 804*a* in the microvisor engine 804 may perform the memory subsystem monitoring operations 1300 discussed above to monitor the metadata for the memory subsystem 806 in order to identify whether microvisor-independent data modifications of the memory subsystem 806 have occurred. If, at decision block 906, no modification of data stored in the first memory subsystem is identified, the method 900 returns to block 904. As such, the method 900 may loop such that the microvisor sub-engine 804*a* continues to monitor the memory subsystem 806 until it identifies that microvisor-independent data modifications of the memory subsystem 806 have occurred.

Figure 14:
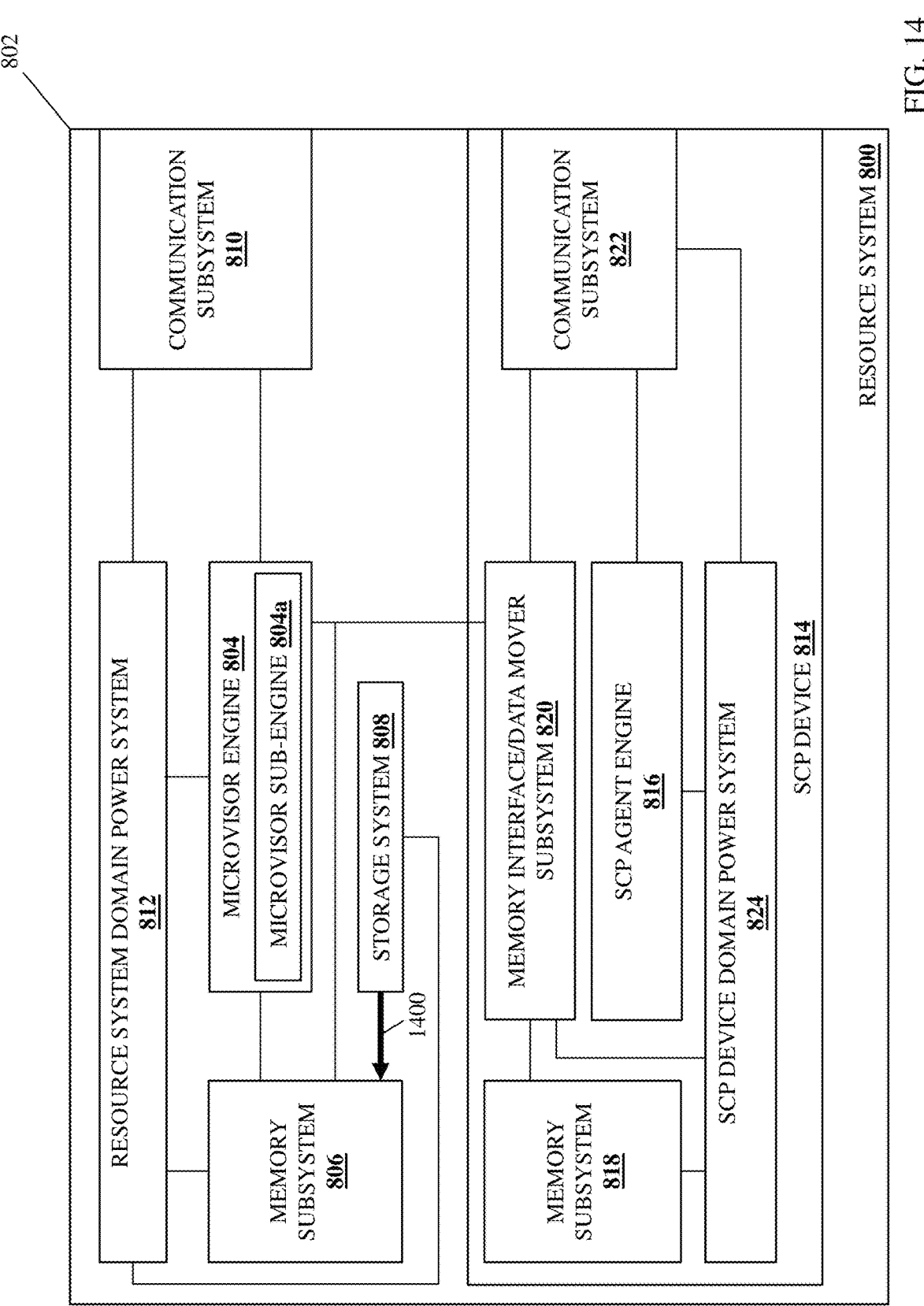
FIG. 14 is a schematic view illustrating an embodiment of the resource system of FIG. 8 operating during the method of FIG. 9.

If, at decision block 906, a modification of data stored in the first memory subsystem is identified, the method 900 proceeds to block 908 where the microvisor subsystem generates and transmits a data copy instruction to a memory interface/data mover subsystem. With reference to FIG. 14, in an embodiment of decision block 906, the storage system 808 may perform memory subsystem data modification operations 1400 that include modifying data stored in the memory subsystem 806, and one of skill in the art in possession of the present disclosure will appreciate how the storage system 808 may be configured to modify data in the memory subsystem 806 independently of the microvisor engine 804 (i.e., as the microvisor engine 804 is not in the path between the storage system 808 and the memory subsystem 806), as such direct data modifications are relatively faster than using the microvisor engine 804 to modify data in the memory subsystem 806 for the storage system 808.

For example, a storage service that is provided by the storage system 808 as part of the provision of the LCS 1202 and the performance of the workload requested via the workload intent at block 902 may perform the memory subsystem data modification operations 1400 in order to cache, journal, and/or otherwise store data destined for persistent storage in the storage system 808 (e.g., data included in "random" write operations directed to the storage system may be accumulated in the memory subsystem 806 that provides the "primary" memory subsystem for the persistent memory resource 1202*a* (e.g., the vNVDIMM) emulated for the LCS 1202, and that accumulated data may later be written to the storage system 808 as part of a large, sequential write operation in order to improve latency, amplification, and/or other characteristics of write operations to the storage system 808).

However, while a specific example of the modification of data on the memory subsystem 806 has been described, one of skill in the art in possession of the present disclosure will appreciate how data stored on a memory subsystem that provides a "primary" memory subsystem for the emulated persistent memory resource of the present disclosure may be modified by a variety of systems, services, and/or reasons that will fall within the scope of the present disclosure as well. As will be appreciated by one of skill in the art in possession of the present disclosure, the memory subsystem monitoring operations 1300 performed by the microvisor sub-engine 804*a* in the microvisor engine 804 as described above may then identify the modification of the data on the memory subsystem 806 that occurs as a result of the memory subsystem data modification operations 1400.

Figure 15:
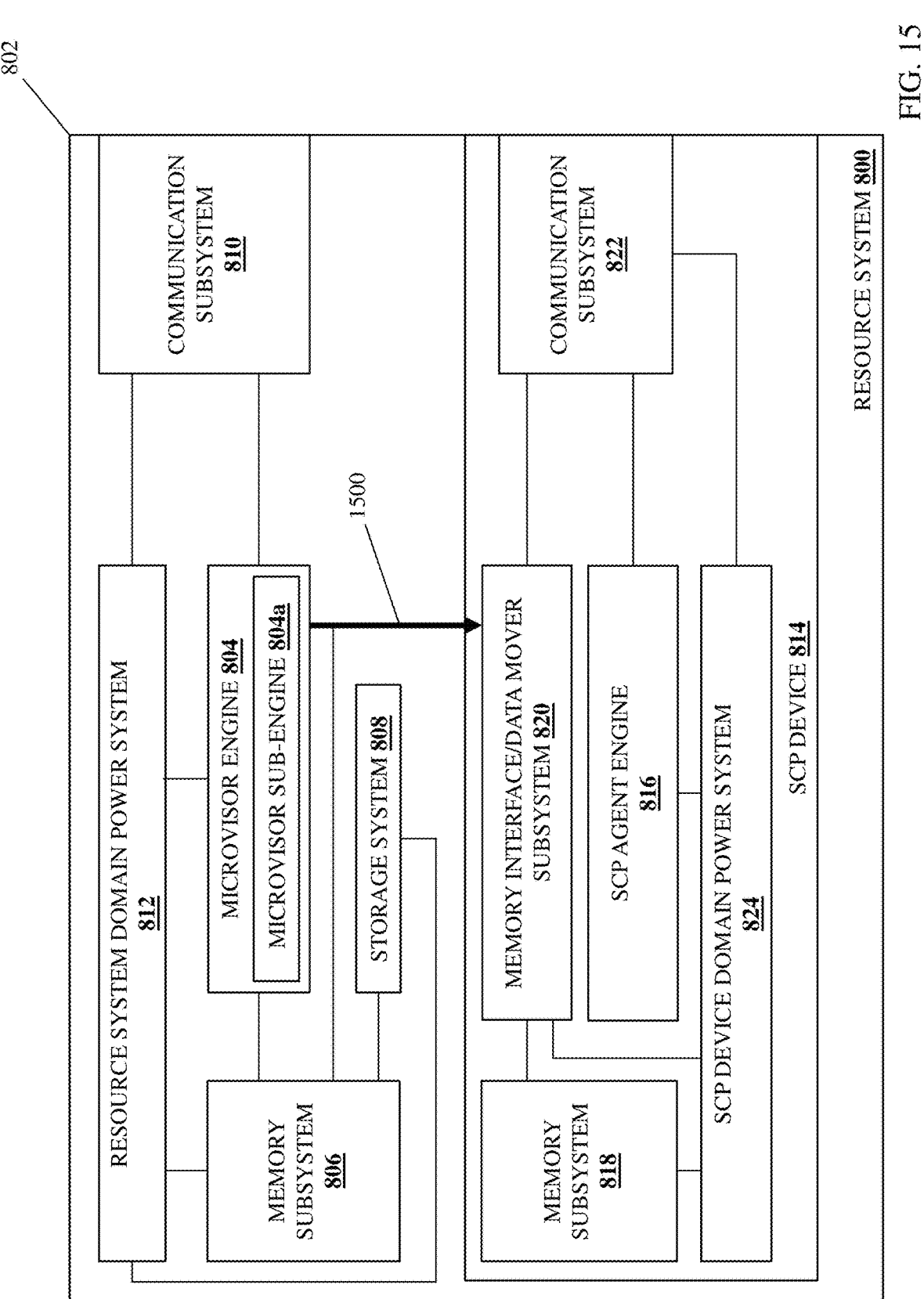
FIG. 15 is a schematic view illustrating an embodiment of the resource system of FIG. 8 operating during the method of FIG. 9.

With reference to FIG. 15, in an embodiment of block 908 and in response to identifying the modification of the data on the memory subsystem 806 at decision block 906, the microvisor sub-engine 804*a* in the microvisor engine 804 may perform data copy instruction transmission operations 1500 that including generating and transmitting a data copy instruction to the memory interface/data mover subsystem 820 on the SCP device 814 that, as discussed below, is configured to cause the memory interface/data mover subsystem 820 to copy the data stored on the memory subsystem 806 to a memory subsystem that is part of a different power domain. The method 900 then returns to block 904. As such, the method 900 may loop such that any modifications to the data stored on the memory subsystem 806 are identified by the microvisor sub-engine 804*a* and result in the microvisor sub-engine 804*a* generating and transmitting the data copy instruction to the memory interface/data mover subsystem 820.

Referring now to FIG. 16, an embodiment of a method 1600 for emulating a persistent memory resource using memory subsystems in multiple power domains is illustrated. As discussed below, the systems and methods of the present disclosure provide for the emulation of a persistent memory resource using memory subsystems in different power domains. For example, the multi-power-domain emulated persistent memory resource system of the present disclosure may include a memory interface/data mover subsystem coupled to a second memory subsystem in a second power domain, and a microvisor subsystem coupled to the memory interface/data mover subsystem and a first memory subsystem in a first power domain that is different than the second power domain. The memory interface/data mover subsystem receives a data copy instruction from the microvisor subsystem and, in response, copies data from the first memory subsystem to the second memory subsystem. Following an unavailability of the first domain power system that results in a loss of the data on the first memory subsystem, the memory interface/data mover subsystem copies data from the second memory subsystem to the first memory subsystem. As such, NVDIMM-dependent storage service functionality may be enabled for storage services provided with resource systems that do not include NVDIMM devices.

The method 1600 begins at decision block 1602 where the method 1600 proceeds depending on whether a data copy instruction is received. In an embodiment, at decision block 1602 and as discussed above with reference to block 908 of the method 900, the microvisor sub-engine 804*a* in the microvisor engine 804 may generate and transmit a data copy instruction to the memory interface/data mover subsystem 820 on the SCP device 814 in response to identifying a modification of the data stored on the memory subsystem 806. As such, at decision block 1602, a data copy instruction may be received by the memory interface/data mover subsystem, and the method 1600 will proceed to block 1604 where the memory interface/data mover subsystem copies data from the first memory subsystem to a second memory subsystem powered by a second domain power system that is part of a second power domain.

Figure 17A:
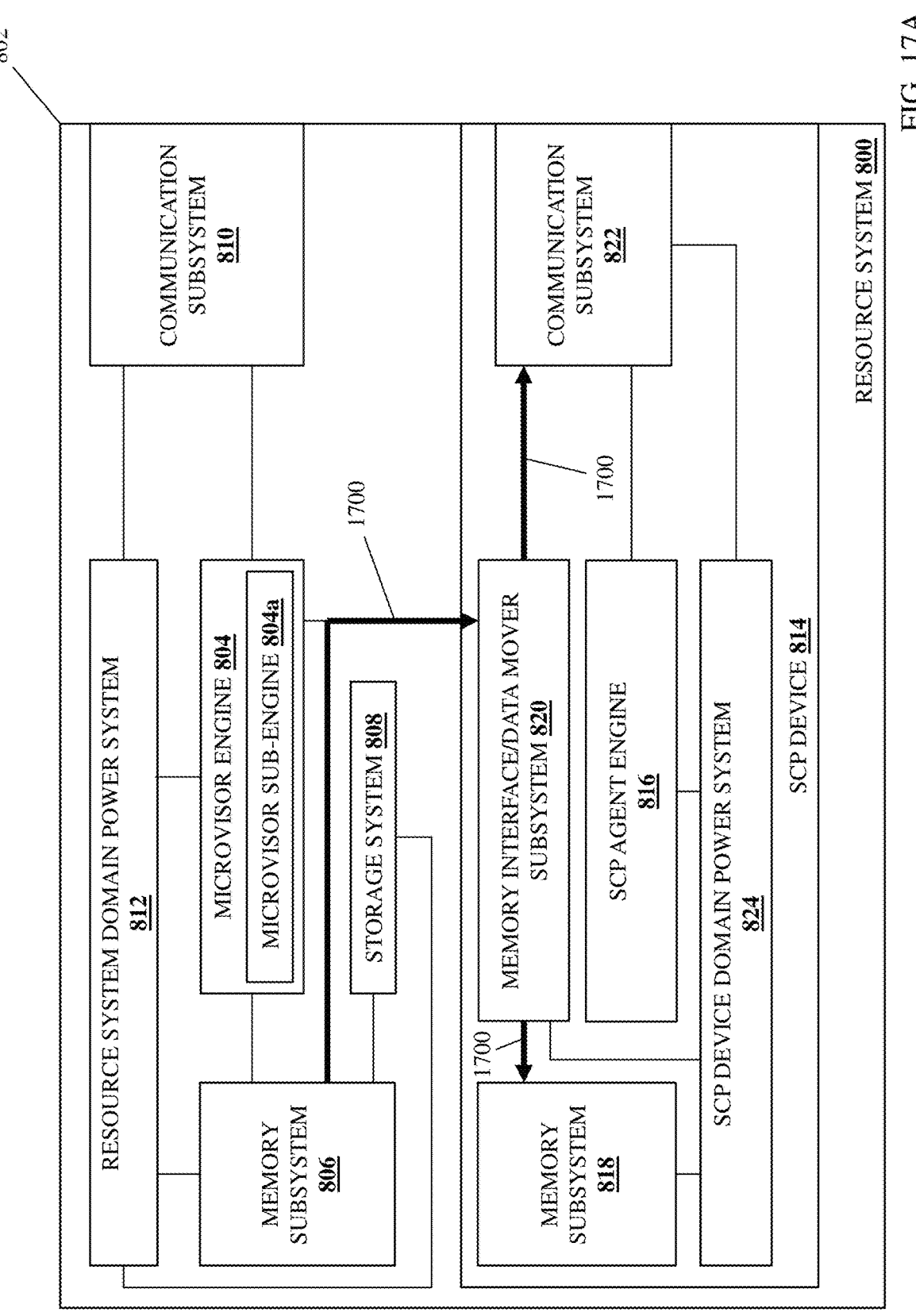
FIG. 17A is a schematic view illustrating an embodiment of the resource system of FIG. 8 operating during the method of FIG. 16.
Figure 17B:
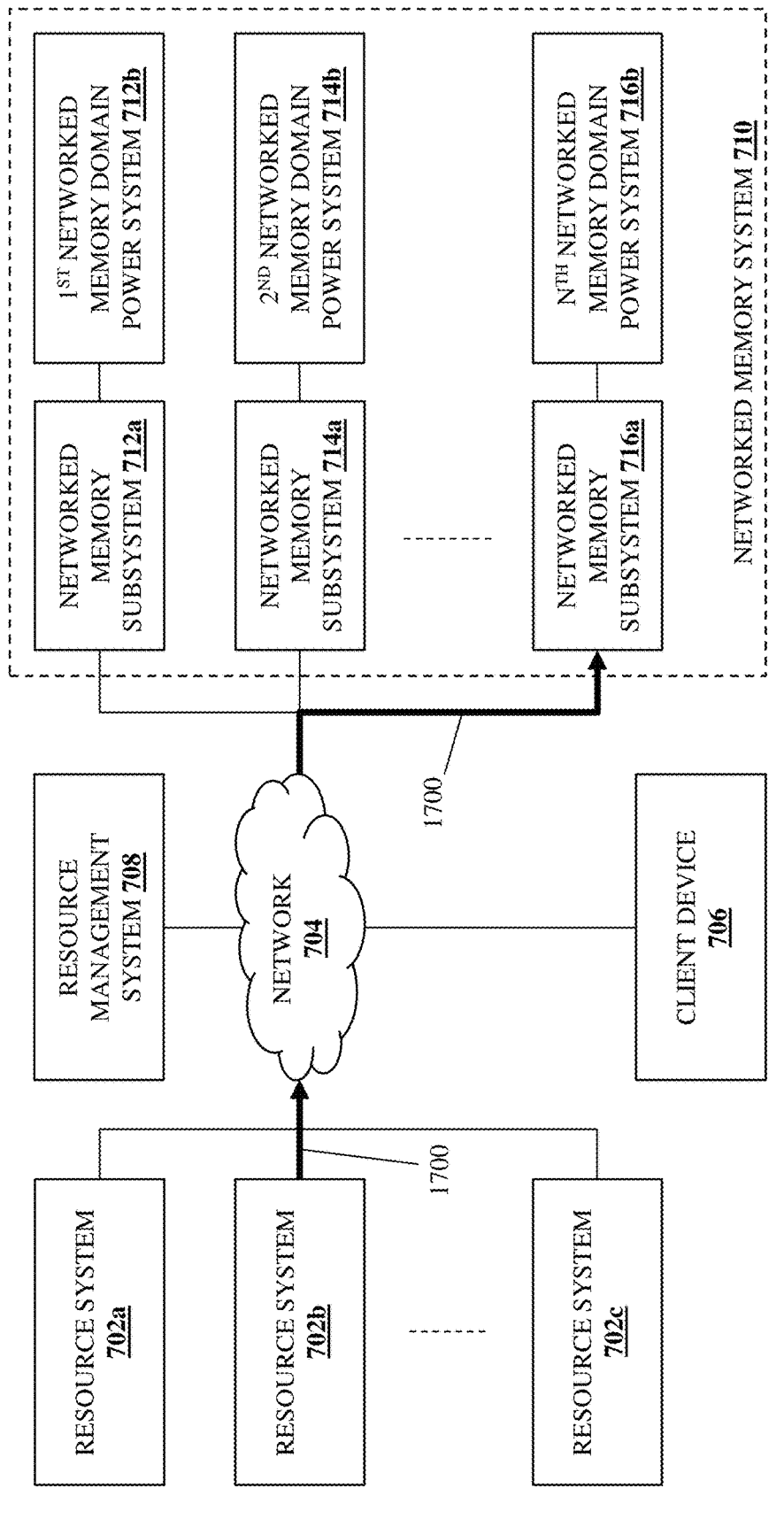
FIG. 17B is a schematic view illustrating an embodiment of the networked system of FIG. 7 operating during the method of FIG. 16.

With reference to FIGS. 17A and 17B, in an embodiment of block 1604, the memory interface/data mover subsystem 820 on the SCP device 814 in the resource system 702*b*/800 may perform data copy operations 1700 that, in the specific example provided herein, may include reading the data from the memory subsystem 806, writing that data to the memory subsystem 818, and writing that data via its communication subsystem 822 and the network 704 to the networked memory subsystem 716*a* in the networked memory system 710. However, as discussed above, while the data is described as being copied to both the memory subsystem 818 and the memory networked memory subsystem 716*a*, one of skill in the art in possession of the present disclosure will appreciate how the data may be copied to only one of the memory subsystem 818 and the networked memory subsystem 716*a* while remaining within the scope of the present disclosure as well.

As such, one of skill in the art in possession of the present disclosure will appreciate how the identification by the microvisor engine 804 of the modification of data in the memory subsystem 806 and its resulting use of the memory interface/data mover subsystem 820 (e.g., via the data copy instruction) to copy the data from the memory subsystem 806 in the resource system power domain to the memory subsystem 818 in the SCP device power domain and/or the networked memory subsystem 716*a* in the N$^{th}$ networked memory power domain operates to ensure that the data stored on the "primary" memory subsystem for the persistent memory resource 1202*a* is backed up on at least one "secondary" memory subsystem that is in a different power domain than the "primary" memory subsystem.

Furthermore, while the microvisor engine 804 is described as using the memory interface/data mover subsystem 820 to copy the data from the memory subsystem 806 to the memory subsystem 818 and/or the networked memory subsystem 716*a*, one of skill in the art in possession of the present disclosure will appreciate how other embodiments (e.g., when the memory interface/data mover subsystem 820 is busy or otherwise unavailable to perform the data copy operations described above) may involve the microvisor engine 804 copying the data from the memory subsystem 806 to the memory subsystem 818 and/or to the networked memory subsystem 716*a* (e.g., via an "alternate" path provided by its communication system 810) while remaining within the scope of the present disclosure as well.

If, at decision block 1602, no data copy instruction is received, or following block 1604, the method 1600 proceeds to decision block 1606 where the method 1600 proceeds depending on whether the first domain power system is unavailable. As will be appreciated by one of skill in the art in possession of the present disclosure, power systems may fail, malfunction, and/or otherwise may become unavailable such that devices, components, and/or other subsystems that utilize the power domain they provide no longer receive power. As such, at decision block 1606, the memory interface/data mover subsystem 802 on the SCP device 814 in the resource system 702*b*/800 may be configured to monitor the resource system domain power system 812 and, if the resource system domain power system 812 is available, the method 1600 returns to block 1602. As such, the method 1600 may loop such that the memory interface/data mover subsystem 802 copies data from the memory subsystem 806 to the memory subsystem 818 and the networked memory subsystem 716*a* when a data copy instruction is received as long as the resource system domain power system 812 remains available.

Figure 18A:
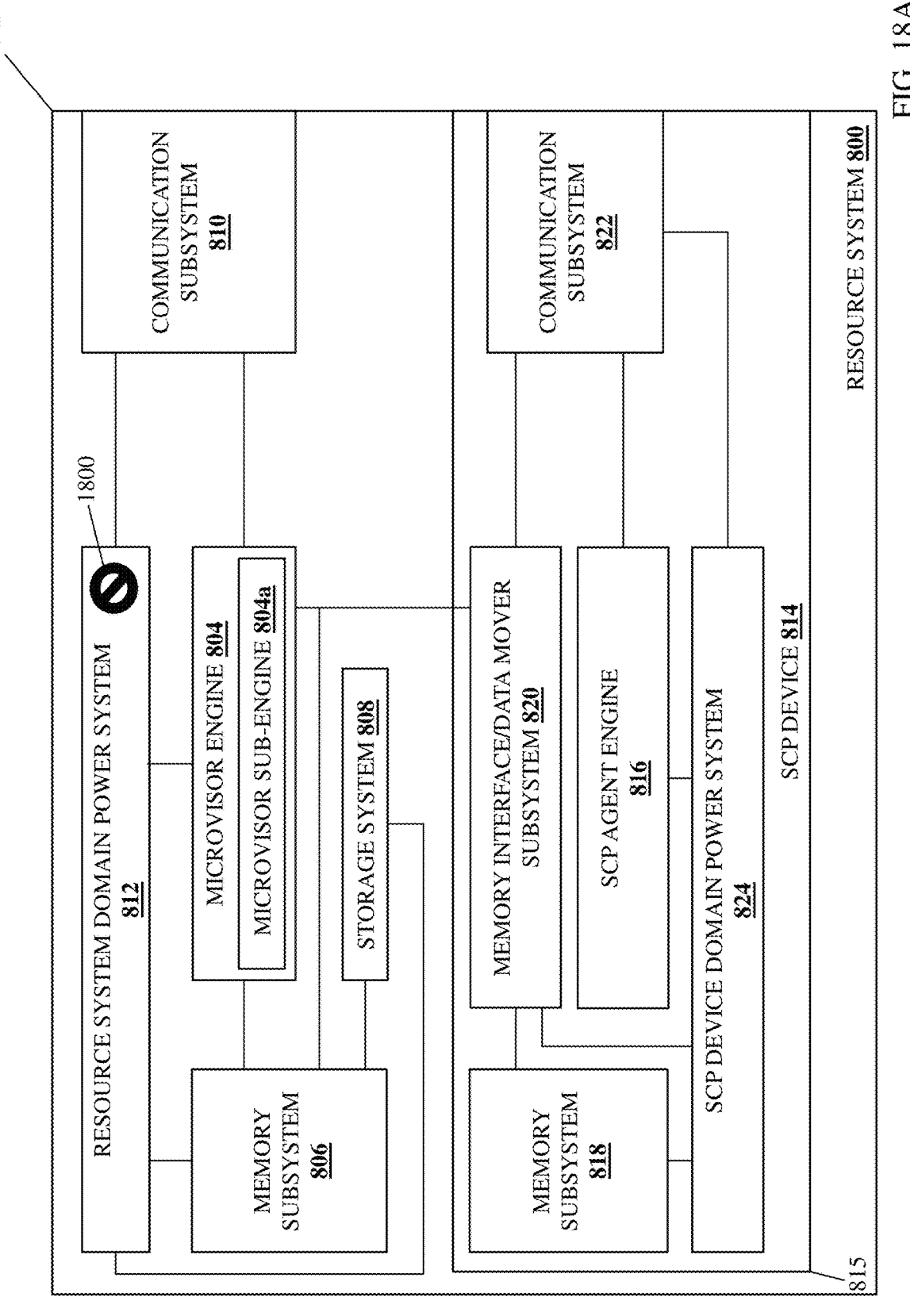
FIG. 18A is a schematic view illustrating an embodiment of the resource system of FIG. 8 operating during the method of FIG. 16.

If, at decision block 1606, the first domain power system is unavailable, the method 1600 proceeds to block 1608 where the memory interface/data mover subsystem copies data from the second memory subsystem to the first memory subsystem. With reference to FIG. 18A, in an embodiment of decision block 1608, the resource system domain power system 812 may fail, malfunction, and/or otherwise become unavailable (as indicated by element 1800 in FIG. 18A). As will be appreciated by one of skill in the art in possession of the present disclosure, the unavailability of the resource system domain power system 812 will cause the data in the memory subsystem 806 (e.g., provided by volatile DRAM device(s)) to be lost.

Figure 18B:
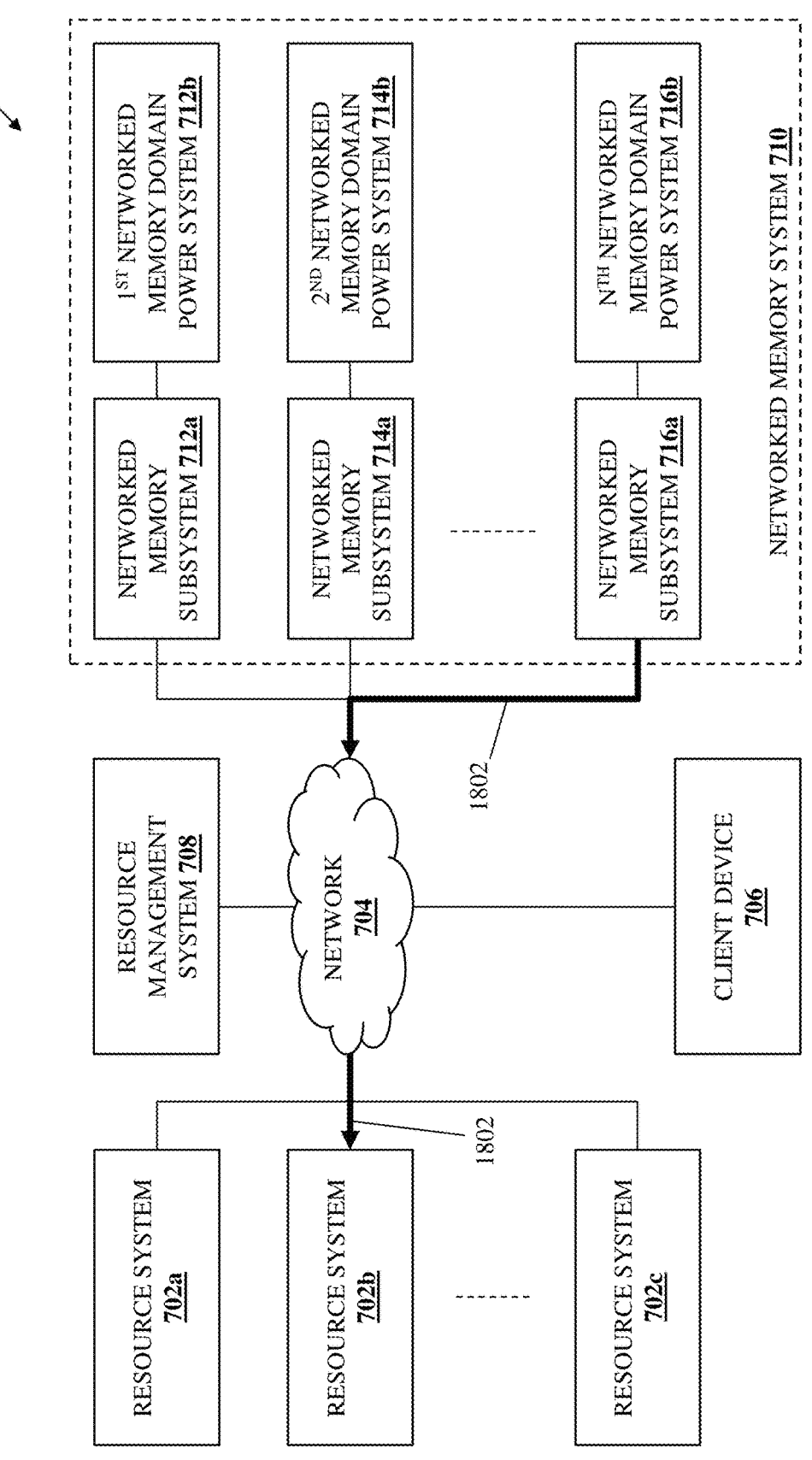
FIG. 18B is a schematic view illustrating an embodiment of the networked system of FIG. 7 operating during the method of FIG. 16.
Figure 18C:
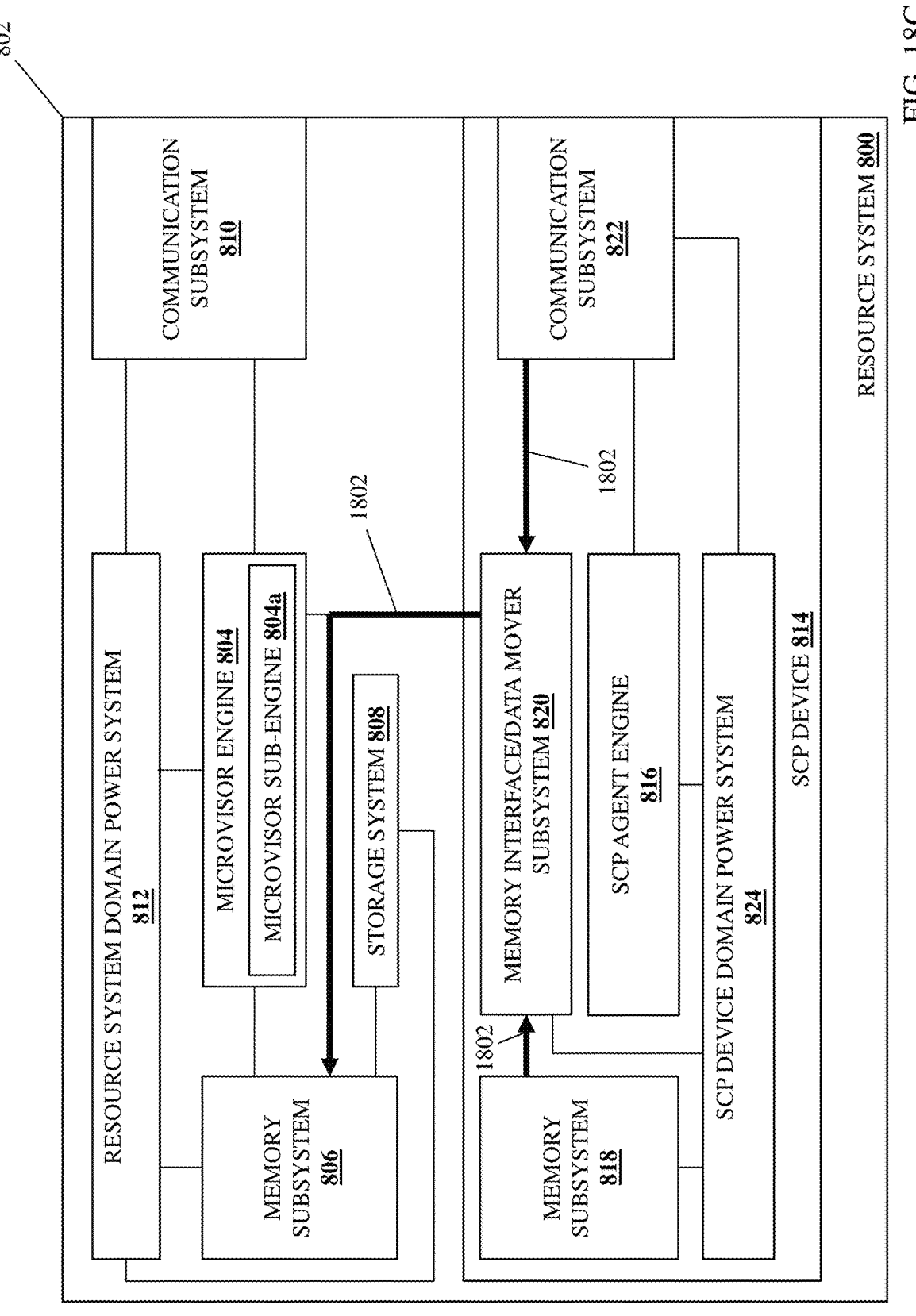
FIG. 18C is a schematic view illustrating an embodiment of the resource system of FIG. 8 operating during the method of FIG. 16.

However, one of skill in the art in possession of the present disclosure will also appreciate how the resource system domain power system 812 may be repaired, replaced, recovered, and/or may otherwise subsequently become available. With reference to FIGS. 18B and 18C, upon the subsequent availability of the resource system domain power system 812, the memory interface/data mover subsystem 820 on the SCP device 814 in the resource system 702*b*/800 may perform data recovery operations 1802 that may include reading the data stored on the memory subsystem 818, and/or reading the data stored on the networked memory subsystem 716*a* in the networked memory system 710 via the communication subsystem 822 and the network 704, and writing that data to the memory subsystem 806. As such, the contents of the persistent memory resource 1202*a* emulated by the microvisor sub-engine 804*a* in the microvisor engine 804 may be resynchronized from the "secondary" memory subsystem(s) provided by the memory subsystem 818 and/or the networked memory subsystem 716*a* to the primary memory subsystem provided by the memory subsystem 806 in response to a subsequent availability of the resource system domain power system 812 following its unavailability.

In situations in which the LCS 1202 becomes unavailable due to the unavailability of the resource system domain power system 812 (e.g., because the operating system for the LCS is being provided by the processing system/memory system in the resource system 702*b*/800), the resynchronization of the persistent memory resource 1202*a* emulated by the microvisor sub-engine 804*a* may be performed before the re-initialization of the LCS 1202. As such, the data stored in the persistent memory resource 1202*a* emulated by the microvisor sub-engine 804*a* may appear from the point of view of the LCS 1202 as persistent across power failures of the BMS that provides that LCS 1202. The method 1600 then returns to decision block 1602.

While the embodiments illustrated and described above provide persistent memory resource functionality for single LCS provided by a single resource system (i.e., the LCS 1202 provided by the resource system 702*b*/800), one of skill in the art in possession of the present disclosure will appreciate how the teachings of the present disclosure may be expanded to provide persistent memory resource functionality for multiple LCSs provided using any of the resource systems 702*a*-702*c*, any of the SCP devices 814 included therein, and the networked memory system 710. For example, any LCS provided using a resource system may be provided with an emulated persistent memory resource that utilizes a "primary" memory subsystem in its resource system, and a "secondary" memory subsystem in the SCP device included in its resource system, an SCP device included in another resource system (e.g., via a Compute eXpress Logic (CXL) fabric), and/or any of the networked memory subsystems 712*a*-716*a* included in the networked memory system 710. Furthermore, one of skill in the art in possession of the present disclosure will appreciate how the persistent memory resource emulation functionality described above required no changes to conventional storage service software used by conventional LCSs.

Thus, systems and methods have been described that provide for the emulation of a persistent memory resource using memory subsystems in different power domains. For example, the multi-power-domain emulated persistent memory resource system of the present disclosure may include a memory interface/data mover subsystem coupled to a second memory subsystem in a second power domain, and a microvisor subsystem coupled to the memory inter-face/data mover subsystem and a first memory subsystem in a first power domain that is different than the second power domain. The microvisor subsystem presents an emulated persistent memory resource to a client device using the first memory subsystem, and monitors metadata for the first memory subsystem to identify modification(s) of data in the first memory subsystem. In response to identifying the modification of the data stored in the first memory subsystem, the microvisor subsystem uses the memory interface/data mover subsystem to copy the data from the first memory subsystem to a second memory subsystem that is configured to receive power from a second domain power system that is part of a second power domain that is different than the first power domain, and following an unavailability of the first domain power system that results in a loss of the data on the first memory subsystem, the memory interface/data mover subsystem will copy the data from the second memory subsystem to the first memory subsystem. As such, NVDIMM-dependent storage service functionality may be enabled for storage services provided with resource systems that do not include NVDIMM devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-power-domain emulated persistent memory resource system, comprising:
   a first memory subsystem that is configured to receive power from a first domain power system that is part of a first power domain;
   a second memory subsystem that is configured to receive power from a second domain power system that is part of a second power domain that is different than the first power domain;
   a memory interface/data mover subsystem that is coupled to the second memory subsystem; and
   a microvisor subsystem that is coupled to first memory subsystem and the memory interface/data mover subsystem, wherein the microvisor subsystem is configured to:
      present, to a client device using the first memory subsystem, an emulated persistent memory resource;
      monitor metadata for the first memory subsystem;
      identify, based on the monitoring of the metadata for the first memory subsystem, a modification of data stored in the first memory subsystem; and
      use, in response to identifying the modification of the data stored in the first memory subsystem, the memory interface/data mover subsystem to copy the data from the first memory subsystem to the second memory subsystem,
      and wherein the memory interface/data mover subsystem is configured to:
         copy, following an unavailability of the first domain power system that results in a loss of the data on the first memory subsystem, the data from the second memory subsystem to the first memory subsystem.

2. The system of claim 1, further comprising:
   a resource system chassis that houses the first memory subsystem and the microvisor subsystem; and a System Control Processor (SCP) chassis that is housed in the resource system chassis and that supports the second memory subsystem and the memory interface/data mover subsystem.

3. The system of claim 1, further comprising:

a resource system chassis that houses the first memory subsystem and the microvisor subsystem; and a System Control Processor (SCP) chassis that is housed in the resource system chassis and that supports the memory interface/data mover subsystem, wherein the second memory subsystem is coupled to the memory interface/data mover subsystem via a network.

4. The system of claim 1, wherein the emulated persistent memory resource is a virtual Non-Volatile Dual Inline Memory Module (vNVDIMM).

5. The system of claim 1, wherein each of the first memory subsystem and the second memory subsystem include at least one Dynamic Random Access Memory (DRAM) device.

6. The system of claim 1, further comprising:

a storage system that is coupled to the first memory subsystem and that is configured to store the data in the first memory subsystem independently of the microvisor subsystem.

7. An Information Handling System (IHS), comprising:

a microvisor processing system; and a microvisor memory system that is coupled to the microvisor processing system and that includes instructions that, when executed by the microvisor processing system, cause the microvisor processing system to provide a microvisor engine that is configured to:

present, to a client device using a first memory subsystem that is coupled to the microvisor processing system and that is configured to receive power from a first domain power system that is part of a first power domain, an emulated persistent memory resource;

monitor metadata for the first memory subsystem;

identify, based on the monitoring of the metadata for the first memory subsystem, a modification of data stored in the first memory subsystem;

generate, in response to identifying the modification of the data stored in the first memory subsystem, a data copy instruction that is configured to cause a memory interface/data mover engine to copy the data from the first memory subsystem to a second memory subsystem that is configured to receive power from a second domain power system that is part of a second power domain that is different than the first power domain; and transmit, to the memory interface/data mover engine, the data copy instruction.

8. The IHS of claim 7, further comprising:

a memory interface/data mover processing system; and a memory interface/data mover memory system that is coupled to the memory interface/data mover processing system and that includes instructions that, when executed by the memory interface/data mover processing system, cause the memory interface/data mover processing system to provide the memory interface/data mover engine that is configured to:

copy, following an unavailability of the first domain power system that results in a loss of the data on the first memory subsystem, the data from the second memory subsystem to the first memory subsystem.

9. The IHS of claim 8, further comprising:

a resource system chassis that houses the first memory subsystem, the microvisor processing system, and the microvisor memory system; and a System Control Processor (SCP) chassis that is housed in the resource system chassis and that supports the second memory subsystem, the memory interface/data mover processing system, and the memory interface/data mover memory system.

10. The IHS of claim 7, further comprising:

a resource system chassis that houses the first memory subsystem, the microvisor processing system, and the microvisor memory system; and a System Control Processor (SCP) chassis that is housed in the resource system chassis and that supports the memory interface/data mover processing system and the memory interface/data mover memory system, wherein the second memory subsystem is coupled to the memory interface/data mover processing system via a network.

11. The IHS of claim 7, wherein the emulated persistent memory resource is a virtual Non-Volatile Dual Inline Memory Module (vNVDIMM).

12. The IHS of claim 7, wherein each of the first memory subsystem and the second memory subsystem include at least one Dynamic Random Access Memory (DRAM) device.

13. The IHS of claim 7, further comprising:

a storage system that is coupled to the first memory subsystem and that is configured to store the data in the first memory subsystem independently of the microvisor engine.

14. A method for emulating a persistent memory resource using memory subsystems in multiple power domains, comprising:

presenting, by a microvisor subsystem to a client device using a first memory subsystem that is configured to receive power from a first domain power system that is part of a first power domain, an emulated persistent memory resource;

monitoring, by the microvisor subsystem, metadata for the first memory subsystem;

identifying, by the microvisor subsystem based on the monitoring of the metadata for the first memory subsystem, a modification of data stored in the first memory subsystem;

generating, by the microvisor subsystem in response to identifying the modification of the data stored in the first memory subsystem, a data copy instruction that is configured to cause a memory interface/data mover subsystem to copy the data from the first memory subsystem to a second memory subsystem that is configured to receive power from a second domain power system that is part of a second power domain that is different than the first power domain; and transmitting, to the memory interface/data mover engine, the data copy instruction.

15. The method of claim 14, further comprising:

copy, by the memory interface/data mover subsystem following an unavailability of the first domain power system that results in a loss of the data on the first memory subsystem, the data from the second memory subsystem to the first memory subsystem.

16. The method of claim 14, wherein the first memory subsystem and the microvisor subsystem are housed in a resource system chassis, and the second memory subsystem and the memory interface/data mover subsystem are supported by a System Control Processor (SCP) chassis that is housed in the resource system chassis.

17. The method of claim 14, wherein the first memory subsystem and the microvisor subsystem are housed in a resource system chassis, the memory interface/data mover subsystem is supported by a System Control Processor (SCP) chassis that is housed in the resource system chassis, and the second memory subsystem is coupled to the memory interface/data mover subsystem via a network.

18. The method of claim 14, wherein the emulated persistent memory resource is a virtual Non-Volatile Dual Inline Memory Module (vNVDIMM).

19. The method of claim 14, wherein each of the first memory subsystem and the second memory subsystem include at least one Dynamic Random Access Memory (DRAM) device.

20. The method of claim 14, further comprising:
storing, by a storage system that is coupled to the first memory subsystem, the data in the first memory subsystem independently of the microvisor subsystem.

* * * * *